(12) United States Patent
Lee

(10) Patent No.: US 11,054,619 B2
(45) Date of Patent: Jul. 6, 2021

(54) WIDE-ANGLE LENS ASSEMBLY

(71) Applicants: Sintai Optical (Shenzhen) Co., Ltd., ShenZhen (CN); Asia Optical Co., Inc., Taichung (TW)

(72) Inventor: Tsan-Haw Lee, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 153 days.

(21) Appl. No.: 16/513,001

(22) Filed: Jul. 16, 2019

(65) Prior Publication Data

US 2020/0081226 A1    Mar. 12, 2020

(30) Foreign Application Priority Data

Sep. 6, 2018  (CN) .......................... 201811038502.8

(51) Int. Cl.
*G02B 9/64* (2006.01)
*G02B 13/00* (2006.01)

(52) U.S. Cl.
CPC ............ *G02B 13/005* (2013.01); *G02B 9/64* (2013.01)

(58) Field of Classification Search
CPC .... G02B 13/00; G02B 13/005; G02B 13/006; G02B 13/06; G02B 15/1465; G02B 9/64
See application file for complete search history.

(56) References Cited

U.S. PATENT DOCUMENTS

| | | | | | |
|---|---|---|---|---|---|
| 3,832,035 | A | * | 8/1974 | Takahashi | G02B 13/04 359/708 |
| 4,699,474 | A | * | 10/1987 | Ozawa | G02B 15/145125 359/683 |
| 7,813,050 | B1 | * | 10/2010 | Hsu | G02B 15/145125 359/683 |
| 2005/0094002 | A1 | * | 5/2005 | Ohashi | G02B 15/177 348/240.99 |
| 2006/0050406 | A1 | * | 3/2006 | Ishii | G02B 13/06 359/680 |
| 2006/0176576 | A1 | * | 8/2006 | Nagahara | G02B 13/16 359/680 |
| 2010/0027136 | A1 | * | 2/2010 | Ohashi | G02B 13/04 359/753 |

(Continued)

FOREIGN PATENT DOCUMENTS

CN    105182507 A    12/2015
CN    207704133 U    8/2018

*Primary Examiner* — Balram T Parbadia
(74) *Attorney, Agent, or Firm* — McClure, Qualey & Rodack, LLP

(57) ABSTRACT

A wide-angle lens assembly comprises sequentially from an object side to an image side along an optical axis a first lens, a second lens, a third lens, a fourth lens, a fifth lens and a sixth lens, a seventh lens, an eighth lens, and a ninth lens. The first lens is a meniscus lens with refractive power. The second lens is a meniscus lens with refractive power. The third lens has refractive power and includes a concave surface facing the object side. The fourth lens has positive refractive power and includes a convex surface facing the image side. The fifth lens has refractive power. The sixth lens is a biconvex lens with positive refractive power. The seventh lens has refractive power. The eighth lens has positive refractive power. The ninth lens has positive refractive power.

18 Claims, 18 Drawing Sheets

(56) References Cited

U.S. PATENT DOCUMENTS

| | | | | |
|---|---|---|---|---|
| 2011/0164324 A1* | 7/2011 | Okumura | ............... | G02B 13/06 |
| | | | | 359/682 |
| 2011/0249344 A1* | 10/2011 | Nagatoshi | ...... | G02B 15/144513 |
| | | | | 359/682 |
| 2012/0013996 A1* | 1/2012 | Okumura | ....... | G02B 15/143507 |
| | | | | 359/691 |
| 2012/0013997 A1* | 1/2012 | Yamanaka | ............... | G02B 7/10 |
| | | | | 359/701 |
| 2012/0050603 A1* | 3/2012 | Imaoka | ................ | G02B 15/142 |
| | | | | 348/347 |
| 2012/0099208 A1* | 4/2012 | Peng | .............. | G02B 15/145113 |
| | | | | 359/683 |
| 2014/0226219 A1* | 8/2014 | Baba | ...................... | G02B 15/04 |
| | | | | 359/680 |
| 2014/0354857 A1* | 12/2014 | Kato | .............. | G02B 15/145121 |
| | | | | 348/240.3 |
| 2015/0241670 A1* | 8/2015 | Amano | ................. | G02B 13/04 |
| | | | | 359/680 |
| 2015/0362708 A1* | 12/2015 | Lee | ........................ | G02B 13/16 |
| | | | | 359/708 |
| 2016/0103301 A1* | 4/2016 | Liang | .................... | G02B 13/04 |
| | | | | 359/708 |
| 2016/0170175 A1* | 6/2016 | Chang | ................ | G02B 13/0045 |
| | | | | 359/708 |
| 2016/0259154 A1* | 9/2016 | Heu | ........................ | G02B 9/60 |
| 2017/0153429 A1* | 6/2017 | Kuo | ........................ | G02B 13/16 |
| 2017/0176721 A1* | 6/2017 | Kim | ...................... | G02B 27/646 |
| 2018/0180860 A1* | 6/2018 | Kurioka | ............... | G02B 27/646 |
| 2018/0299657 A1* | 10/2018 | Yoshinaga | ..... | G02B 15/144503 |
| 2019/0004296 A1* | 1/2019 | Sugita | .................. | G02B 15/1461 |
| 2019/0064491 A1* | 2/2019 | Sugita | .................... | G02B 13/02 |
| 2019/0204569 A1* | 7/2019 | Jiang | ...................... | G02B 13/06 |

* cited by examiner

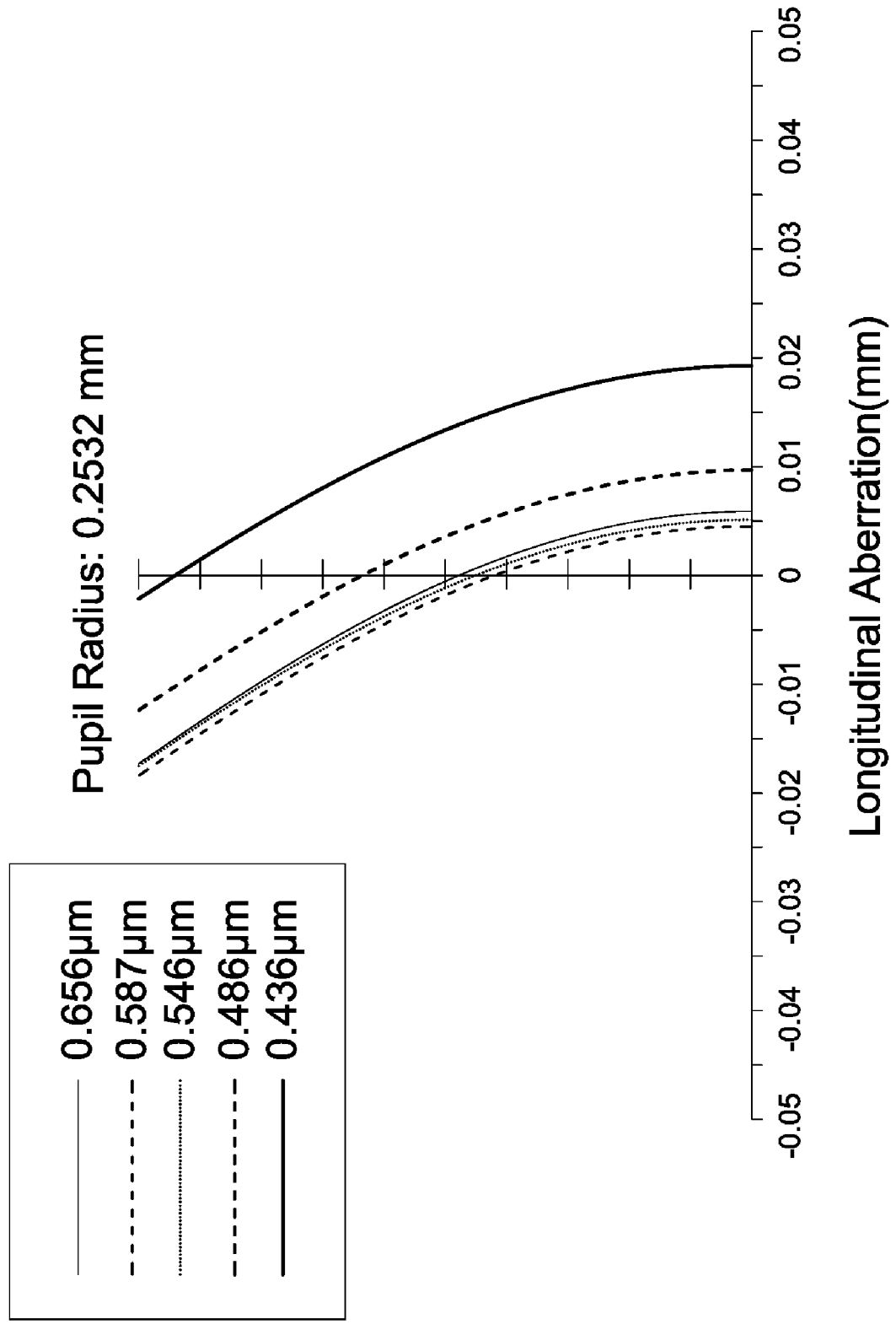

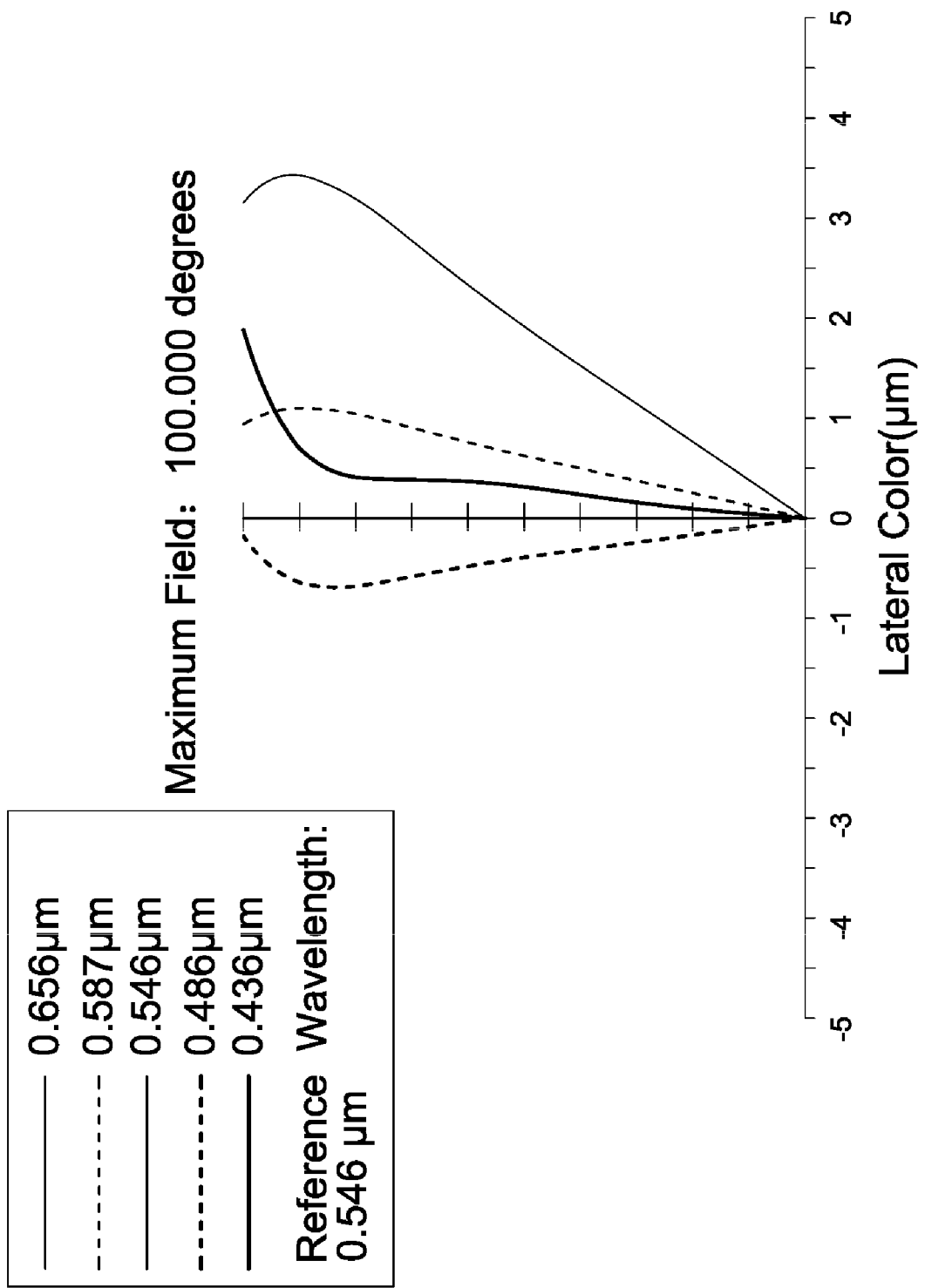

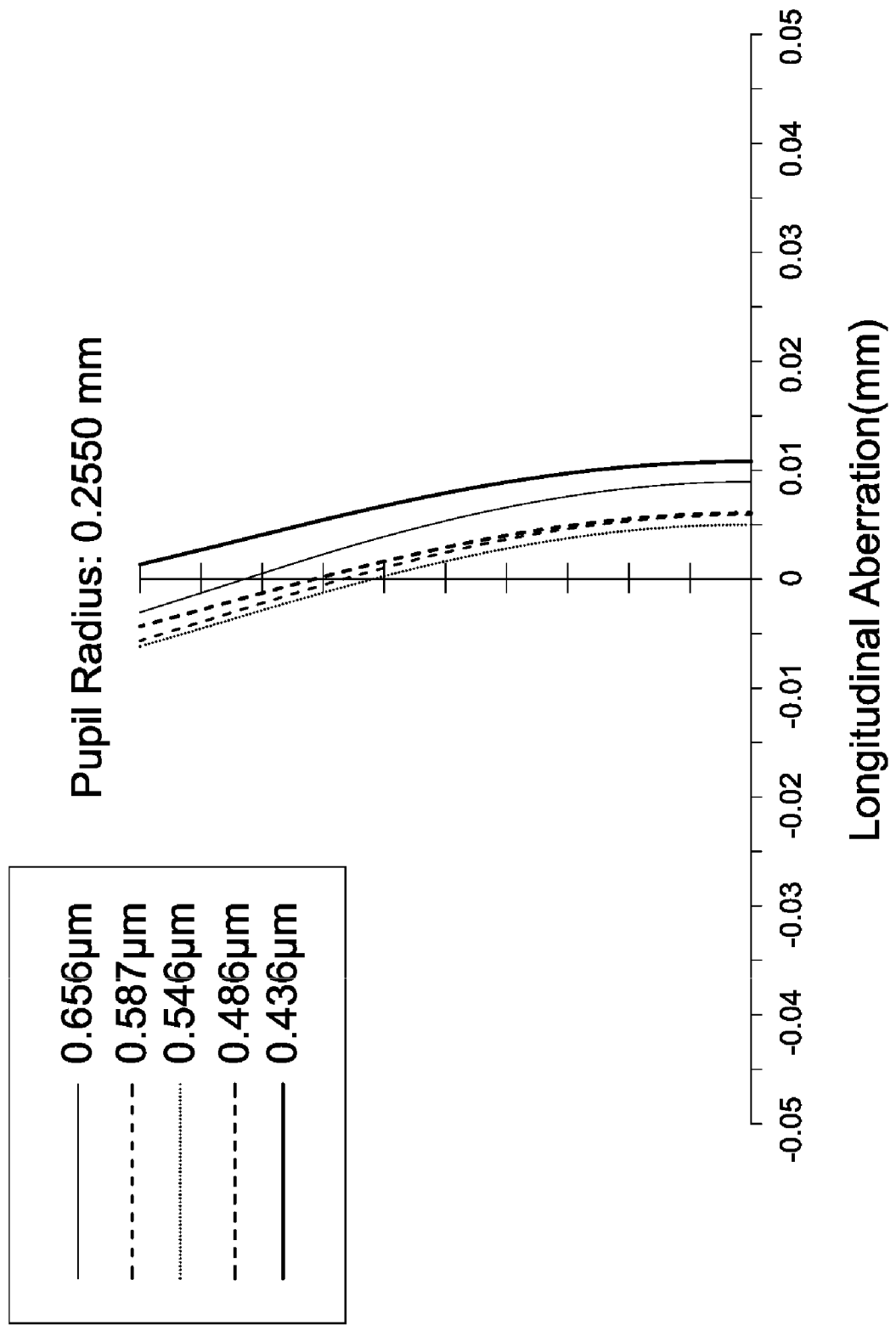

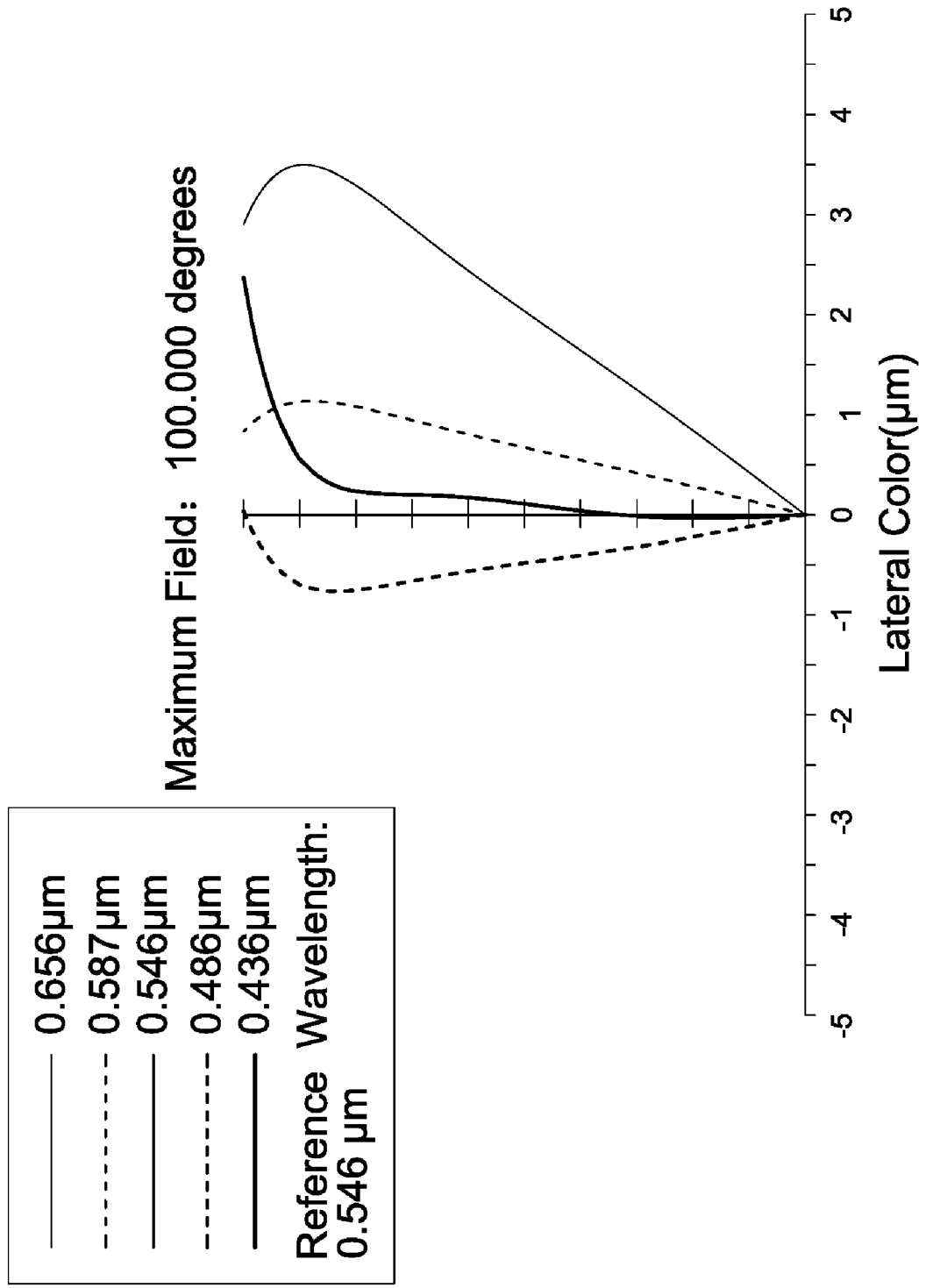

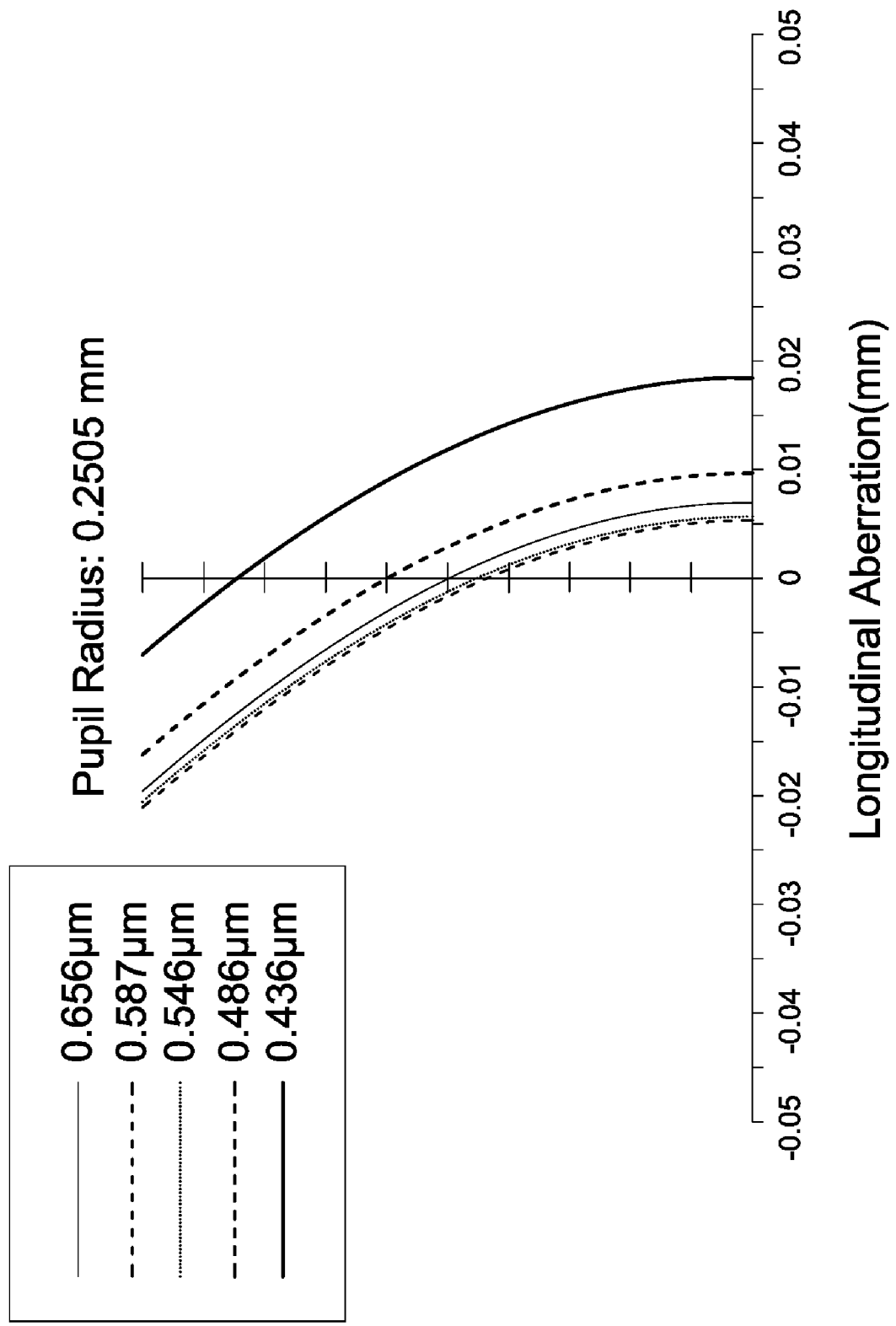

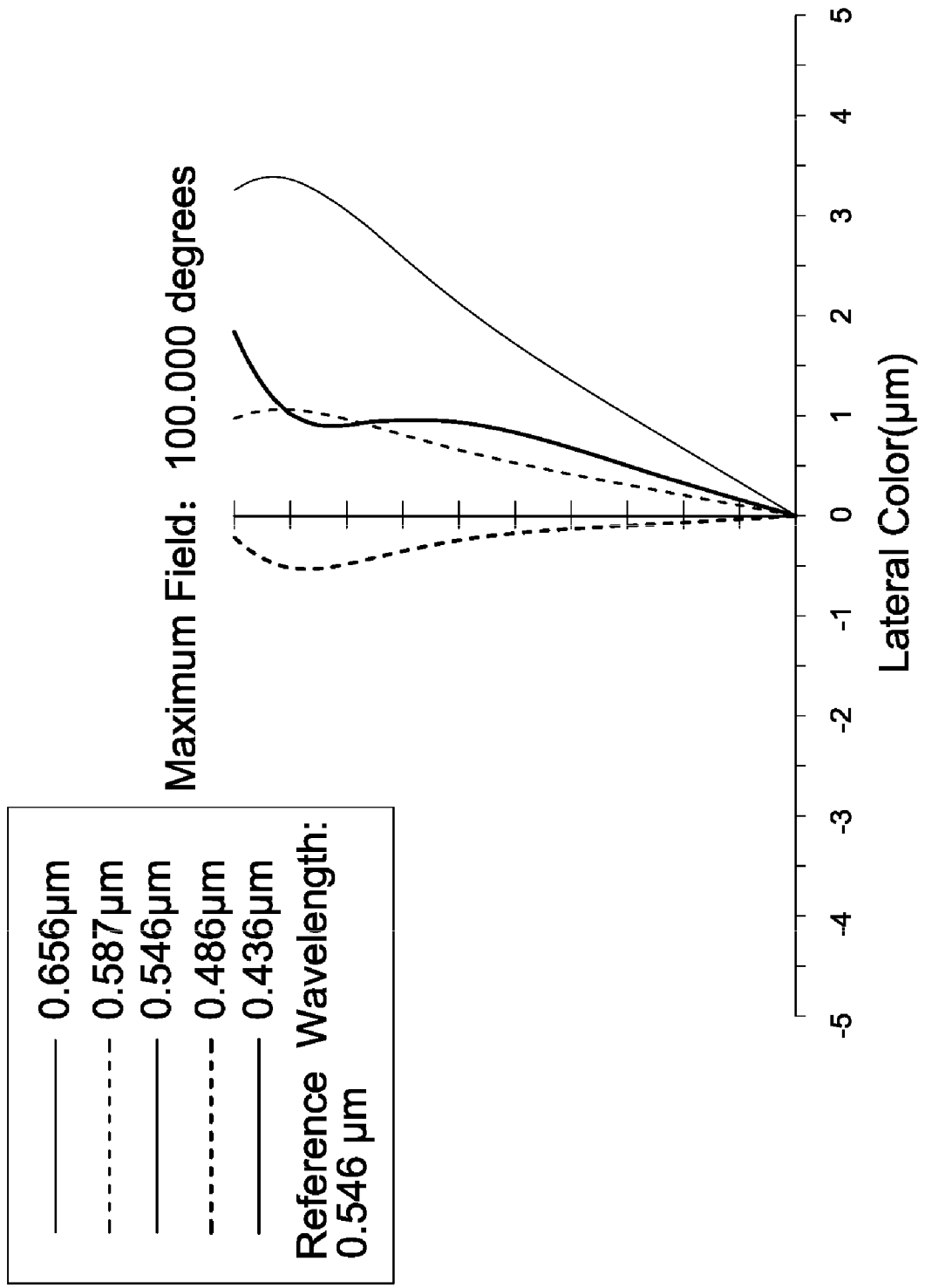

WIDE-ANGLE LENS ASSEMBLY

CROSS REFERENCE TO RELATED APPLICATIONS

This Application claims priority of China Patent Application No. 201811038502.8, filed on Sep. 6, 2018, the entirety of which is incorporated by reference herein.

BACKGROUND OF THE INVENTION

Field of the Invention

The present disclosure is related to a wide-angle lens assembly.

Description of the Related Art

The development of wide-angle lens assemblies nowadays is tending toward having a large view angle and a large aperture. Moreover, such a lens assembly is also required to have a short total length, and a high resolution according to a variety of application requirements. However, the wide-angle lens assemblies known in the art have already not fit the requirements now. Therefore, there is a need to provide a wide-angle lens assembly with another configuration that has a large view angle, a large aperture, a short total length and a high resolution.

BRIEF SUMMARY OF THE INVENTION

For this reason, the present disclosure provides a wide-angle lens assembly that has a large view angle, a small aperture value, a short total length and a high resolution, and achieving great optical performance.

According to an embodiment, the present disclosure provides a wide-angle lens assembly including a first lens, a second lens, a third lens, a fourth lens, a fifth lens, a sixth lens, a seventh lens, an eighth lens and a ninth lens. The first lens has negative refractive power and includes a convex surface facing an object side and a concave surface facing an image side. The second lens has negative refractive power and includes a convex surface facing the object side and a concave surface facing the image side. The third lens has negative refractive power. The fourth lens has positive refractive power. The fifth lens has positive refractive power. The sixth lens has positive refractive power. The seventh lens has negative refractive power. The eighth lens has positive refractive power. The ninth lens has positive refractive power. The first to ninth lenses are arranged in order from the object side to the image side along an optical axis.

According to another embodiment, the present disclosure provides a wide-angle lens assembly including a first lens, a second lens, a third lens, a fourth lens, a fifth lens, a sixth lens, a seventh lens, an eighth lens and a ninth lens. The first lens is a meniscus lens with refractive power. The second lens is a meniscus lens with refractive power. The third lens has refractive power and includes a concave surface facing the object side. The fourth lens has positive refractive power and includes a convex surface facing the image side. The fifth lens has refractive power. The sixth lens is a biconvex lens with positive refractive power. The seventh lens has refractive power. The eighth lens has positive refractive power. The ninth lens has positive refractive power. The first to ninth lenses are arranged in order from the object side to the image side along an optical axis.

In one of the above embodiments, the wide-angle lens assembly further satisfies the following condition:

$$1.55 < TTL/R_{11} < 1.75,$$

wherein TTL is the distance between the object-side surface of the first lens and an imaging surface along the optical axis, and $R_{11}$ is the radius of curvature of an object-side surface of the first lens.

In one of the above embodiments, the wide-angle lens assembly further satisfies the following condition:

$$12.7 < TTL/f < 12.9,$$

wherein TTL is the distance between the object-side surface of the first lens and an imaging surface along the optical axis, and f is the effective focal length of the wide-angle lens assembly.

In one of the above embodiments, the wide-angle lens assembly further satisfies the following condition:

$$-0.4 < f_{123}/f_{45} < -0.3,$$

wherein $f_{123}$ is the effective focal length of the combination of the first lens, second lens and the third lens, and $f_{45}$ is the effective focal length of the combination of the fourth lens and the fifth lens.

In one of the above embodiments, the wide-angle lens assembly further satisfies the following condition:

$$,Vd_2 > 30$$

wherein $Vd_2$ is the Abbe number of the second lens.

In one of the above embodiments, the wide-angle lens assembly further satisfies the following condition:

$$19.5 < Vd_2/Nd_2 < 22.5,$$

wherein $Vd_2$ is the Abbe number of the second lens, and $Nd_2$ is the refractive index of the second lens.

In one of the above embodiments, the wide-angle lens assembly further satisfies the following condition:

$$-2.8 < f_3/f < -1.5,$$

wherein $f_3$ is the focal length of the third lens, and f is the effective focal length of the wide-angle lens assembly.

In one of the above embodiments, the sixth lens and the seventh lens constitutes a doublet lens.

In one of the above embodiments, the wide-angle lens assembly further includes a stop disposed between the fifth lens and the sixth lens.

In one of the above embodiments, the first lens has negative refractive power and includes a convex surface facing the object side and a concave surface facing the image side, the second lens has negative refractive power and includes convex surface facing the object side and a concave surface facing the image side, the third lens is a biconcave lens with negative refractive power, the fourth lens is a biconvex lens, the fifth lens is a biconvex lens with positive refractive power, the sixth lens is a biconvex lens, the seventh lens is a biconcave lens with negative refractive power, the eighth lens is a biconvex lens, the ninth lens is a biconvex lens.

The condition: $12.7 < TTL/f < 12.9$ benefits to achieve miniaturization. The condition: $19.5 < Vd_2/Nd_2 < 22.5$ benefits to eliminate chromatic aberration. Sufficiently-strong refractive power may be achieved when the conditions, $-2.8 < f_3/f < -1.5$, is satisfied.

The above objects, features and advantages of the present disclosure will be more clearly understood from the follow-

BRIEF DESCRIPTION OF THE DRAWINGS

FIG. 2A is a schematic diagram illustrating the longitudinal aberration of the wide-angle lens assembly according to the first embodiment of the present disclosure.

FIG. 2D is a schematic diagram illustrating the lateral color of the wide-angle lens assembly according to the first embodiment of the present disclosure.

FIG. 4A is a schematic diagram illustrating the longitudinal aberration of the wide-angle lens assembly according to the second embodiment of the present disclosure.

FIG. 4D is a schematic diagram illustrating the lateral color of the wide-angle lens assembly according to the second embodiment of the present disclosure.

FIG. 6A is a schematic diagram illustrating the longitudinal aberration of the wide-angle lens assembly according to the third embodiment of the present disclosure.

FIG. 6D is a schematic diagram illustrating the lateral color of the wide-angle lens assembly according to the third embodiment of the present disclosure.

DETAILED DESCRIPTION OF THE INVENTION

Figure 1:
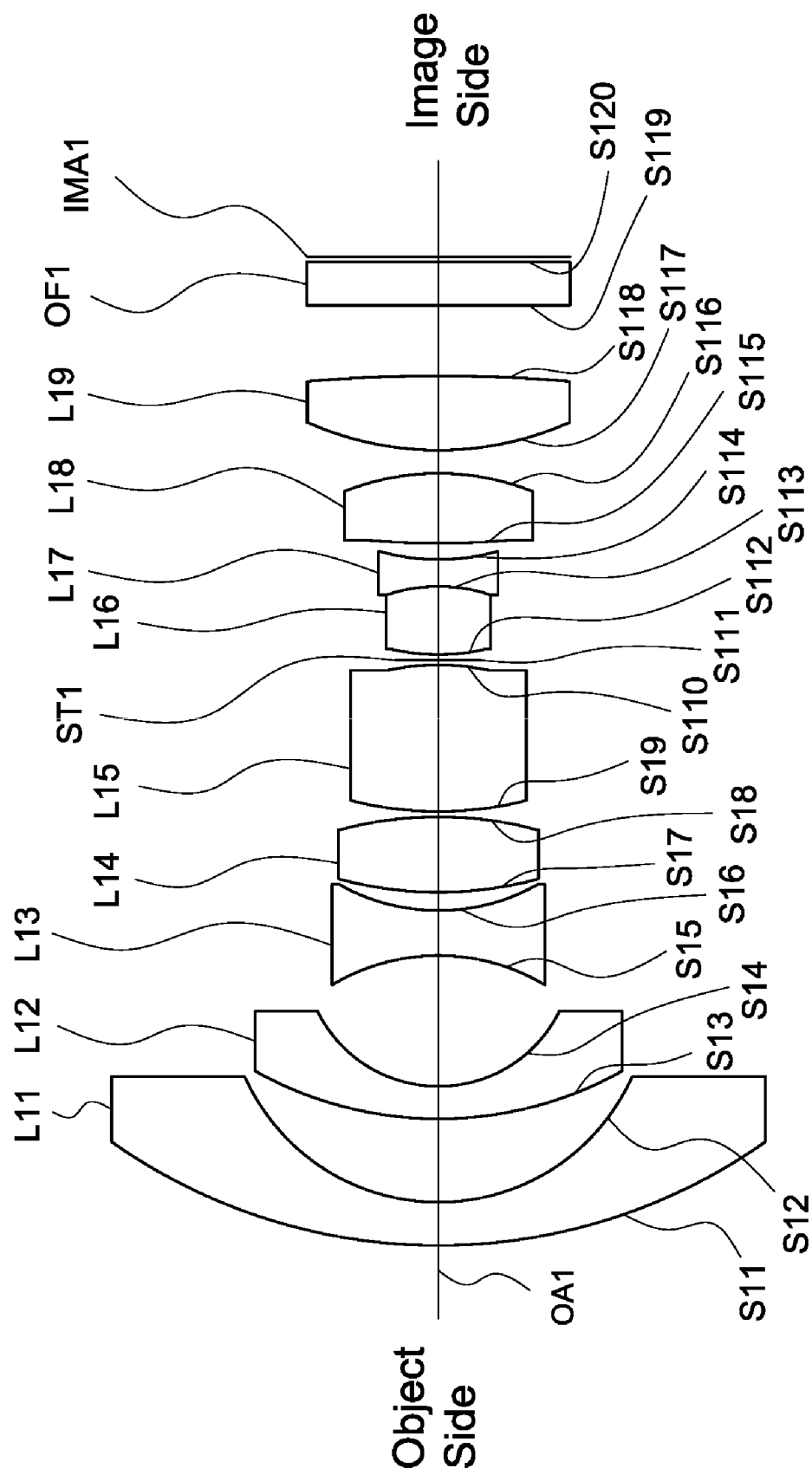
FIG. 1 is a schematic diagram illustrating the lens arrangement of a wide-angle lens assembly according to the first embodiment of the present disclosure.

Please refer to FIG. 1. FIG. 1 is a schematic diagram illustrating the lens arrangement of a wide-angle lens assembly according to the first embodiment of the present disclosure. The wide-angle lens assembly 1 includes a first lens L11, a second lens L12, a third lens L13, a fourth lens L14, a fifth lens L15, an aperture stop ST1, a sixth lens L16, a seventh lens L17, an eighth lens L18, a ninth lens L19 and an optical filter OF1, and these elements are arranged in order from an object side to an image side along an optical axis OA1. During imaging, the light from the object side is imaged on an imaging surface IMA1.

The first lens L11 is a meniscus lens having negative refractive power. The object-side surface S11 of the first lens L11 is a convex surface, and the image-side surface S12 of the first lens L11 is a concave surface. The object-side surface S11 and the image-side surface S12 are spherical surfaces.

The second lens L12 is a meniscus lens having negative refractive power. The object-side surface S13 of the second lens L12 is a convex surface, and the image-side surface S14 of the second lens L12 is a concave surface. The object-side surface S13 and the image-side surface S14 are spherical surfaces.

The third lens L13 is a biconcave lens having negative refractive power. The object-side surface S15 of the third lens L13 is a concave surface, and the image-side surface S16 of the third lens L13 is a concave surface. The object-side surface S15 and the image-side surface S16 are spherical surfaces.

The fourth lens L14 is a biconvex lens having positive refractive power. The object-side surface S17 of the fourth lens L14 is a convex surface, and the image-side surface S18 of the fourth lens L14 is a convex surface. The object-side surface S17 and the image-side surface S18 are spherical surfaces.

The fifth lens L15 is a biconvex lens having positive refractive power. The object-side surface S19 of the fifth lens L15 is a convex surface, and the image-side surface S110 of the fifth lens L15 is a convex surface. The object-side surface S19 and the image-side surface S110 are spherical surfaces.

The sixth lens L16 is a biconvex lens having positive refractive power. The object-side surface S112 of the sixth lens L16 is a convex surface, and the image-side surface S113 of the sixth lens L16 is a convex surface. The object-side surface S112 and the image-side surface S113 are spherical surfaces.

The seventh lens L17 is a biconcave lens having negative refractive power. The object-side surface S113 of the seventh lens L17 is a concave surface, and the image-side surface S114 of the seventh lens L17 is a concave surface. The object-side surface S113 and the image-side surface S114 are spherical surfaces.

The sixth lens L16 and the seventh lens L17 are doublet lenses.

The eighth lens L18 is a biconvex lens having positive refractive power. The object-side surface S115 of the eighth lens L18 is a convex surface, and the image-side surface S116 of the eighth lens L18 is a convex surface. The object-side surface S115 and the image-side surface S116 are spherical surfaces.

The ninth lens L19 is a biconvex lens having positive refractive power. The object-side surface S117 of the ninth lens L19 is a convex surface, and the image-side surface S118 of the ninth lens L19 is a convex surface. The object-side surface S117 and the image-side surface S118 are spherical surfaces.

The object-side surface S119 and the image-side surface S120 of the optical filter OF1 are flat surfaces.

Furthermore, the wide-angle lens assembly 1 in the first embodiment satisfies at least one of the following conditions:

$$1.55 < TTL1/R1_{11} < 1.75 \quad (1)$$

$$12.7 < TTL1/f1 < 12.9 \quad (2)$$

$$-0.4 < f1_{123}/f1_{45} < -0.3 \quad (3)$$

$$Vd1_2 > 30 \quad (4)$$

$$19.5 < Vd1_2/Nd1_2 < 22.5 \quad (5)$$

$$-2.8 < f1_3/f1 < -1.5 \quad (6)$$

wherein TTL1 is the distance between the object-side surface S11 of the first lens L11 and the imaging surface IMA1 along the optical axis OA1, $R1_{11}$ is the radius of curvature of an object-side surface S11 of the first lens L11, f1 is the effective focal length of the wide-angle lens assembly 1, $f1_3$ is the focal length of the third lens L13, $f1_{123}$ is the effective focal length of the combination of the first lens L11, second lens L12 and the third lens L13, $f1_{45}$ is the effective focal length of the combination of the fourth lens L14 and the fifth lens L15, $Vd1_2$ is the Abbe number of the second lens L12, $Nd1_2$ is the refractive index of the second lens L12.

Because of the disposition of the above lenses and the aperture stop ST1 and satisfying one of the conditions (1) to (6), the wide-angle lens assembly 1 may have a wider view angle, an effective corrected aberration, an effective corrected chromatic aberration, and an effective increased resolution.

If the condition (2), TTL1/f1, is greater than 12.9, then it is difficult to achieve miniaturization. Accordingly, the value of TTL1/f1 has to be at least less than 12.9. A preferred range is 12.7<TTL1/f1<12.9. A value within this range is a preferred condition in minimizing the photographing lens.

Table 1 illustrates the parameters of respective lenses in the wide-angle lens assembly 1 shown in FIG. 1. In Table 1, the effective focal length of the wide-angle lens assembly 1 is about 1.42 mm, the aperture value of the wide-angle lens assembly 1 is 2.80, the total length of the wide-angle lens assembly 1 is about 18.2 mm, and the view angle of the wide-angle lens assembly 1 is about 200 degrees.

TABLE 1

| Surface # | Radius of curvature (mm) | Thickness (mm) | Refractive index Nd | Abbe No. Vd | Note |
|---|---|---|---|---|---|
| S11 | 10.49 | 0.80 | 1.88 | 40.81 | First lens L11 |
| S12 | 3.92 | 1.53 | | | |
| S13 | 6.99 | 0.60 | 1.88 | 40.81 | Second lens L12 |
| S14 | 2.50 | 2.41 | | | |
| S15 | −3.79 | 0.83 | 1.50 | 81.61 | Third lens L13 |
| S16 | 3.79 | 0.33 | | | |
| S17 | 7.01 | 1.39 | 1.95 | 32.32 | Fourth lens L14 |
| S18 | −7.01 | 0.10 | | | |
| S19 | 6.72 | 2.70 | 1.50 | 81.61 | Fifth lens L15 |
| S110 | −4.22 | 0.08 | | | |
| S111 | ∞ | 0.11 | | | Aperture stop ST1 |
| S112 | 3.87 | 1.25 | 1.50 | 81.61 | Sixth lens L16 |
| S113 | −3.00 | 0.50 | 1.85 | 23.78 | Seventh lens L17 |
| S114 | 4.08 | 0.30 | | | |
| S115 | 18.59 | 1.28 | 1.59 | 68.62 | Eighth lens L18 |
| S116 | −4.69 | 0.43 | | | |
| S117 | 5.97 | 1.36 | 1.77 | 49.60 | Ninth lens L19 |
| S118 | −30.78 | 1.30 | | | |
| S119 | ∞ | 0.80 | 1.52 | 64.17 | Optical filter OF1 |
| S120 | ∞ | 0.10 | | | |

Table 2 illustrates the parameters for the conditions (1) to (6) and the calculation results of the conditions (1) to (6). From Table 2, the wide-angle lens assembly 1 in the first embodiment can satisfy the conditions (1) to (6).

TABLE 2

| TTL1 | 18.2 mm | $R1_{11}$ | 10.49 mm | f1 | 1.42 mm |
|---|---|---|---|---|---|
| $f1_3$ | −3.66 mm | $f1_{123}$ | −0.99 mm | $f1_{45}$ | 2.777 mm |
| $Vd1_2$ | 40.81 | $Nd1_2$ | 1.88 | | |
| $TTL1/R1_{11}$ | 1.735 | TTL1/f1 | 12.817 | $f1_{123}/f1_{45}$ | −0.356 |
| $Vd1_2/Nd1_2$ | 21.707 | $f1_3/f1$ | −2.577 | | |

Figure 2B:
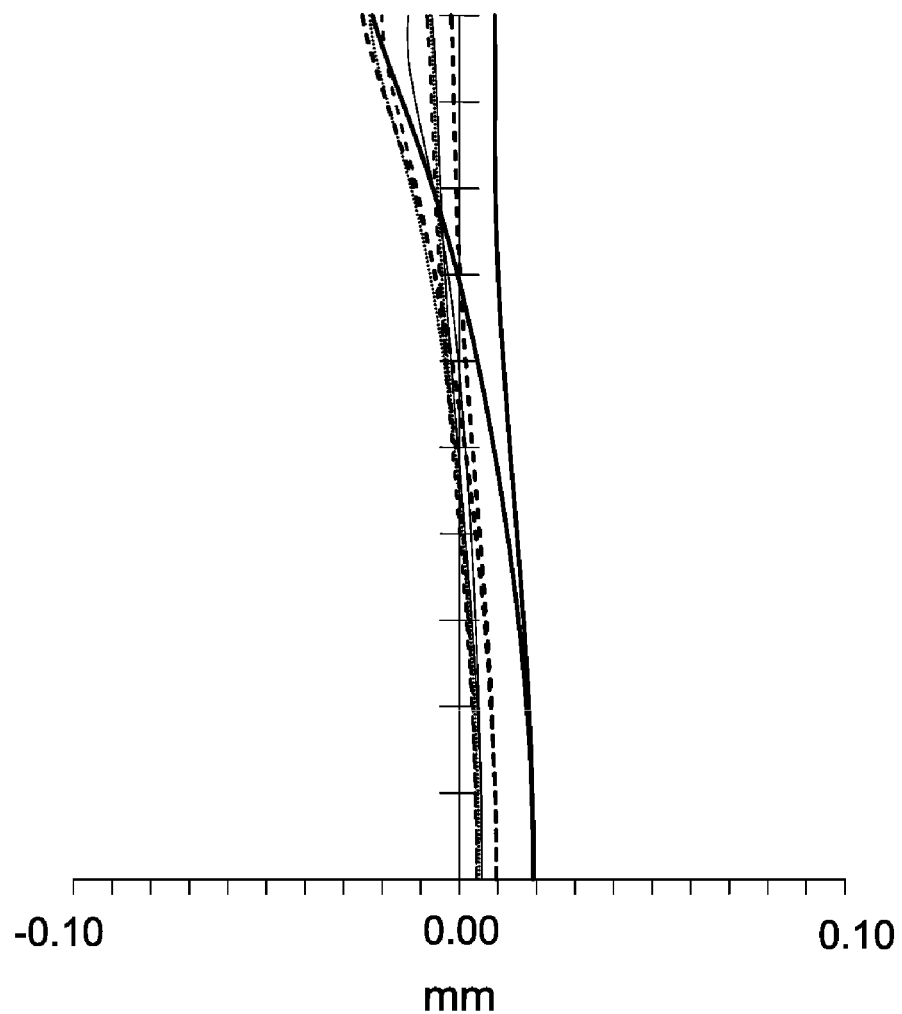
FIG. 2B is a schematic diagram illustrating the field curvature of the wide-angle lens assembly according to the first embodiment of the present disclosure.
Figure 2C:
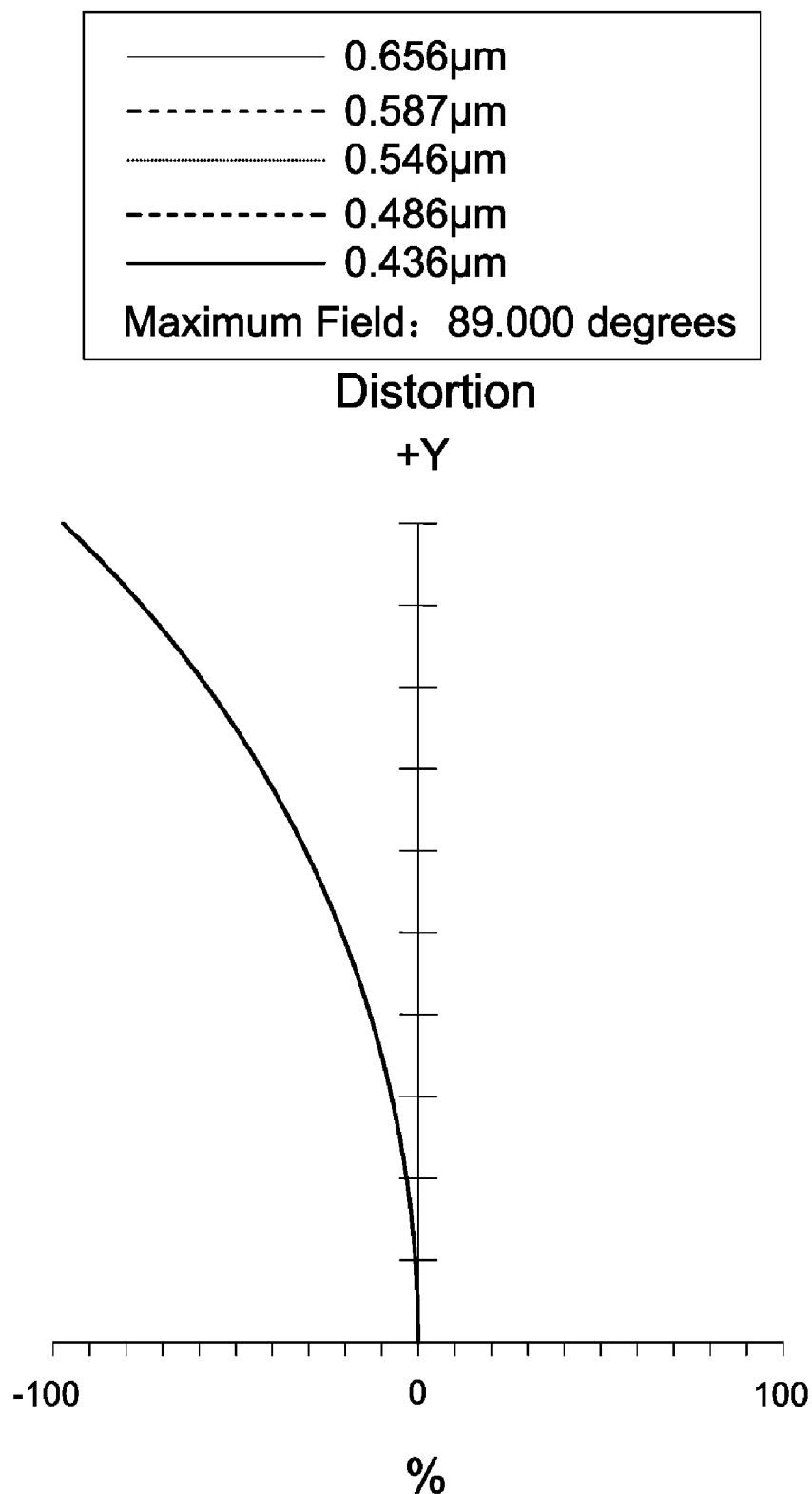
FIG. 2C is a schematic diagram illustrating the distortion of the wide-angle lens assembly according to the first embodiment of the present disclosure.
Figure 2E:
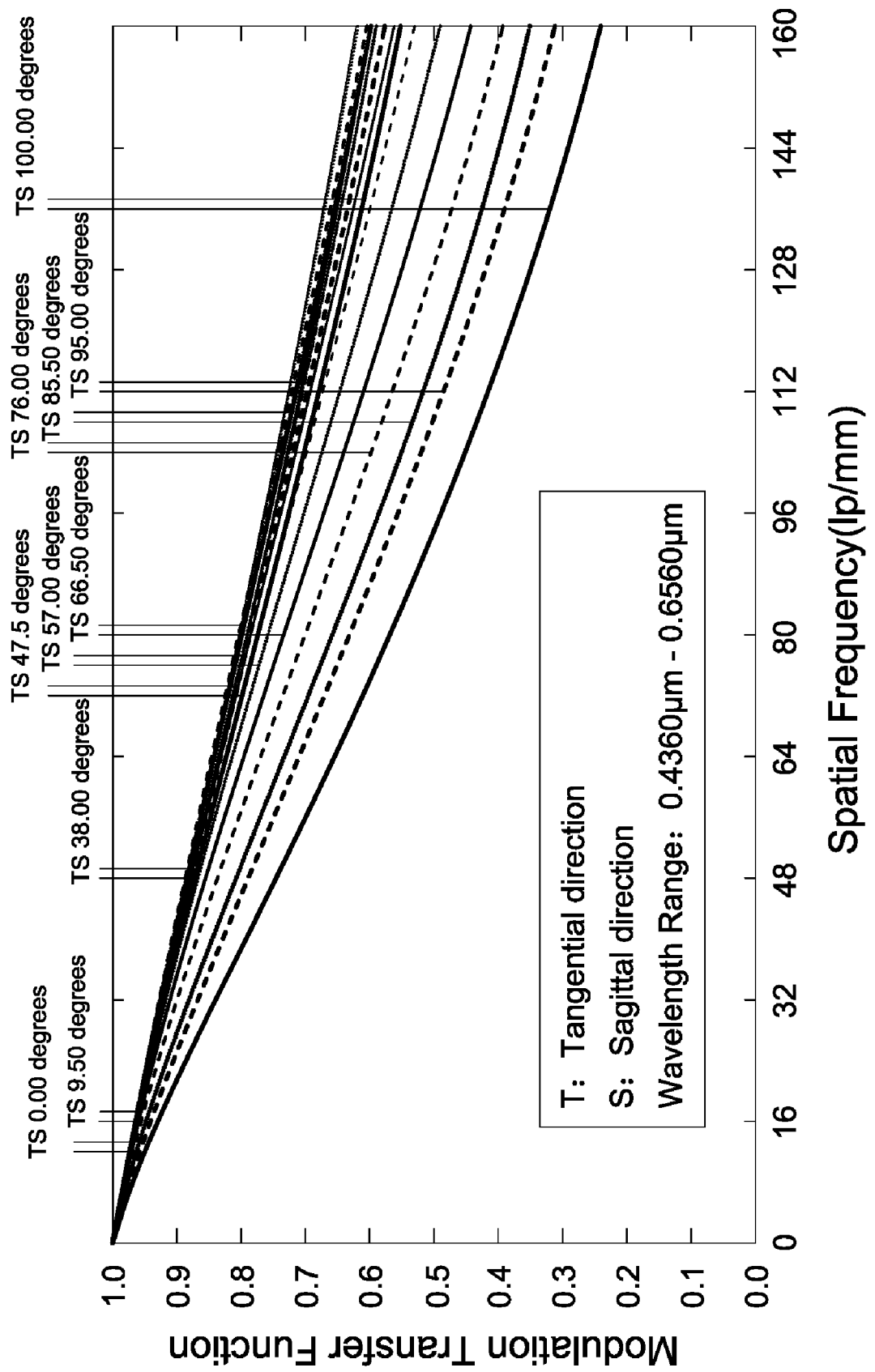
FIG. 2E is a schematic diagram illustrating the modulation transfer function of the wide-angle lens assembly according to the first embodiment of the present disclosure.

Moreover, it can be known from FIG. 2A to FIG. 2E that the wide-angle lens assembly 1 in the first embodiment can achieve the required optical performance. FIG. 2A is a schematic diagram illustrating the longitudinal aberration of the wide-angle lens assembly 1 according to the first embodiment of the present disclosure. FIG. 2B is a schematic diagram illustrating the field curvature of the wide-angle lens assembly 1 according to the first embodiment of the present disclosure. FIG. 2C is a schematic diagram illustrating the distortion of the wide-angle lens assembly 1 according to the first embodiment of the present disclosure. FIG. 2D is a schematic diagram illustrating the lateral color of the wide-angle lens assembly 1 according to the first embodiment of the present disclosure. FIG. 2E is a schematic diagram illustrating the modulation transfer function of the wide-angle lens assembly 1 according to the first embodiment of the present disclosure.

As shown in FIG. 2A, the longitudinal aberration amount in the wide-angle lens assembly 1 in the first embodiment ranges from −0.02 mm to 0.02 mm for the reference wavelengths of 0.436 μm, 0.486 μm, 0.546 μm, 0.587 μm and 0.656 μm.

As shown in FIG. 2B, the field curvature amount in the wide-angle lens assembly 1 in the first embodiment ranges from −0.03 mm to 0.02 mm in the tangential direction and the sagittal direction for the reference wavelengths of 0.436 μm, 0.486 μm, 0.546 μm, 0.587 μm and 0.656 μm.

As shown in FIG. 2C, the five lines almost overlap so that only one line is presented. The distortion amount in the wide-angle lens assembly 1 in the first embodiment ranges from −100% to 0% for the reference wavelengths of 0.436 μm, 0.486 μm, 0.546 μm, 0.587 μm and 0.656 μm.

As shown in FIG. 2D, the lateral color in the wide-angle lens assembly 1 of the first embodiment ranges from −1.0 μm to 3.5 μm, a maximum field angle is equal to 100.0000° for the wavelength of 0.436 μm, 0.486 μm, 0.546 μm, 0.587 μm, and 0.656 μm.

As shown in FIG. 2E, the modulation transfer function of angential direction and sagittal direction in the wide-angle lens assembly 1 of the first embodiment ranges from 0.24 to 1.0 wherein the wavelength ranges from 0.4360 μm to 0.6560 μm, the fields respectively are 0.00°, 9.50°, 38.00°, 47.50°, 57.00°, 66.50°, 76.00°, 85.50°, 95.00°, 100.00°, and the spatial frequency ranges from 0 lp/mm to 160 lp/mm.

Accordingly, it may be appreciated that the longitudinal aberration, the field curvature, the distortion and the lateral color of the wide-angle lens assembly 1 in the first embodiment can be efficiently corrected to achieve preferred optical performance.

Figure 3:
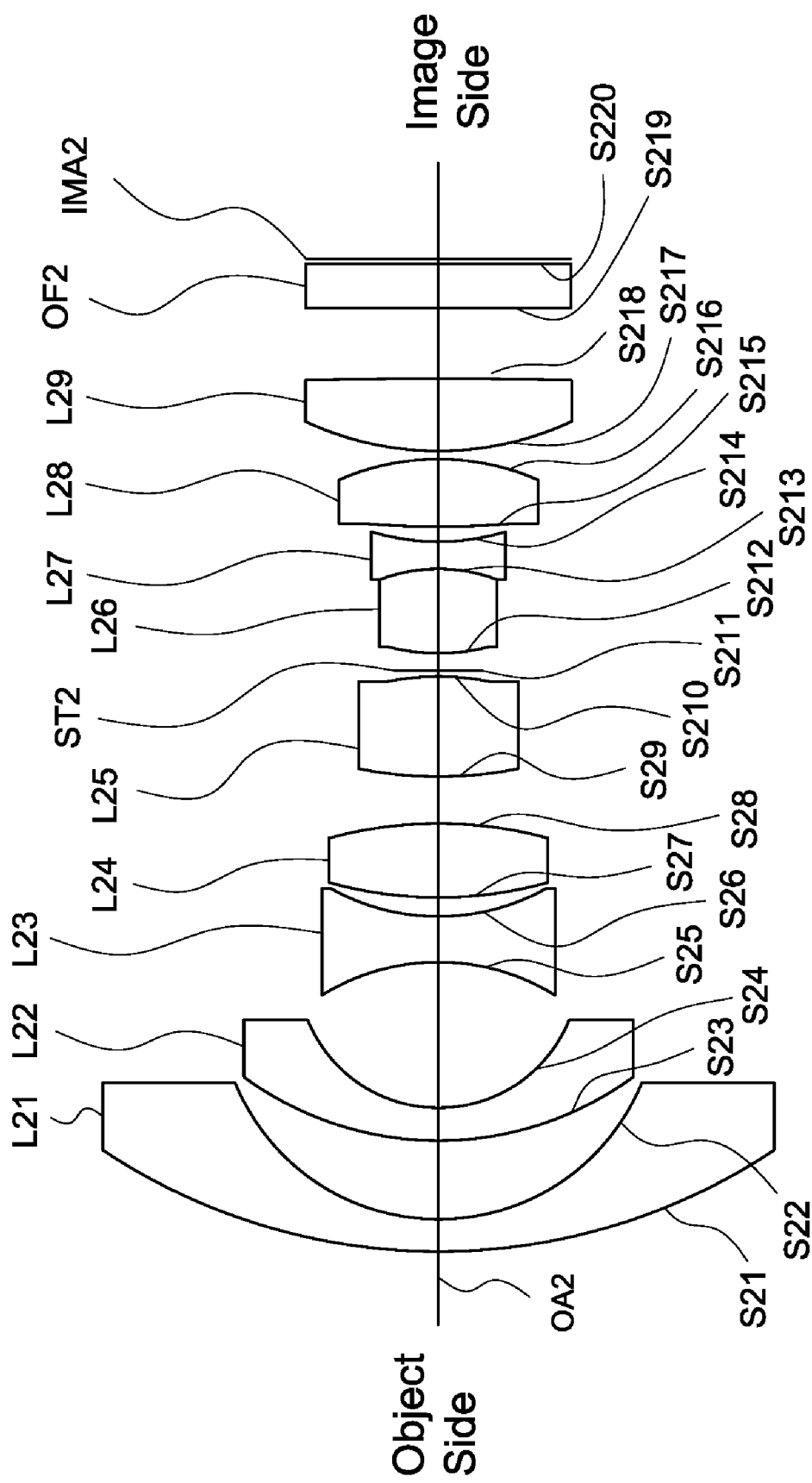
FIG. 3 is a schematic diagram illustrating the lens arrangement of a wide-angle lens assembly according to the second embodiment of the present disclosure.

Please refer to FIG. 3. FIG. 3 is a schematic diagram illustrating the lens arrangement of a wide-angle lens assembly according to the second embodiment of the present disclosure. The wide-angle lens assembly 2 includes a first lens L21, a second lens L22, a third lens L23, a fourth lens L24, a fifth lens L25, an aperture stop ST2, a sixth lens L26, a seventh lens L27, an eighth lens L28, a ninth lens L29 and an optical filter OF2, and these elements are arranged in order from an object side to an image side along an optical axis OA2. During imaging, the light from the object side is imaged on an imaging surface IMA2.

The first lens L21 is a meniscus lens having negative refractive power. The object-side surface S21 of the first lens L21 is a convex surface, and the image-side surface S22 of the first lens L21 is a concave surface. The object-side surface S21 and the image-side surface S22 are spherical surfaces.

The second lens L22 is a meniscus lens having negative refractive power. The object-side surface S23 of the second lens L22 is a convex surface, and the image-side surface S24 of the second lens L22 is a concave surface. The object-side surface S23 and the image-side surface S24 are spherical surfaces.

The third lens L23 is a biconcave lens having negative refractive power. The object-side surface S25 of the third lens L23 is a concave surface, and the image-side surface S26 of the third lens L23 is a concave surface. The object-side surface S25 and the image-side surface S26 are spherical surfaces.

The fourth lens L24 is a biconvex lens having positive refractive power. The object-side surface S27 of the fourth lens L24 is a convex surface, and the image-side surface S28 of the fourth lens L24 is a convex surface. The object-side surface S27 and the image-side surface S28 are spherical surfaces.

The fifth lens L25 is a biconvex lens having positive refractive power. The object-side surface S29 of the fifth lens L25 is a convex surface, and the image-side surface S210 of the fifth lens L25 is a convex surface. The object-side surface S29 and the image-side surface S210 are spherical surfaces.

The sixth lens L26 is a biconvex lens having positive refractive power. The object-side surface S212 of the sixth lens L26 is a convex surface, and the image-side surface S213 of the sixth lens L26 is a convex surface. The object-side surface S212 and the image-side surface S213 are spherical surfaces.

The seventh lens L27 is a biconcave lens having negative refractive power. The object-side surface S213 of the seventh lens L27 is a concave surface, and the image-side surface S214 of the seventh lens L27 is a concave surface. The object-side surface S213 and the image-side surface S214 are spherical surfaces.

The sixth lens L26 and the seventh lens L27 are doublet lenses.

The eighth lens L28 is a biconvex lens having positive refractive power. The object-side surface S215 of the eighth lens L28 is a convex surface, and the image-side surface S216 of the eighth lens L28 is a convex surface. The object-side surface S215 and the image-side surface S216 are spherical surfaces.

The ninth lens L29 is a biconvex lens having positive refractive power. The object-side surface S217 of the ninth lens L29 is a convex surface, and the image-side surface S218 of the ninth lens L29 is a convex surface. The object-side surface S217 and the image-side surface S218 are spherical surfaces.

The object-side surface S219 and the image-side surface S220 of the optical filter OF2 are flat surfaces.

Furthermore, the wide-angle lens assembly 2 in the second embodiment satisfies at least one of the following conditions:

$$1.55 < TTL2/R2_{11} < 1.75 \quad (7)$$

$$12.7 < TTL2/f2 < 12.9 \quad (8)$$

$$0.4 < f2_{123}/f2_{45} < -0.3 \quad (9)$$

$$Vd2_2 > 30 \quad (10)$$

$$19.5 < Vd2_2/Nd2_2 < 22.5 \quad (11)$$

$$2.8 < f2_3/f2 < -1.5 \quad (12)$$

The definitions of $f2_3$, $f2_{45}$, $f2_{123}$, $f2$, $TTL2$, $R2_{11}$, $Vd2_2$ and $Nd2_2$ are respectively the same as those of $f1_3$, $f1_{45}$, $f1_{123}$, $f1$, $TTL1$, $R1_{11}$, $Vd1_2$ and $Nd1_2$ in the first embodiment, and thus, the related descriptions will be omitted hereafter.

Because of the disposition of the above lenses and the aperture stop ST2 and satisfying one of the conditions (7) to (12), the wide-angle lens assembly 2 may have a wider view angle, an effective corrected aberration, an effective corrected chromatic aberration, and an effective increased resolution.

If the condition (11), $Vd2_2/Nd2_2$, is greater than 22.5, the ability to eliminate chromatic aberration is not good enough. Accordingly, the value of $Vd2_2/Nd2_2$ has to be at least less than 22.5. A preferred range is $19.5 < Vd2_2/Nd2_2 < 22.5$. A value within this range is a preferred condition to eliminate chromatic aberration.

Table 3 illustrates the parameters of respective lenses in the wide-angle lens assembly 2 shown in FIG. 3. In Table 3, the effective focal length of the wide-angle lens assembly 2 is about 1.43 mm, the aperture value of the wide-angle lens assembly 2 is 2.80, the total length of the wide-angle lens assembly 2 is about 18.2 mm, and the view angle of the wide-angle lens assembly 2 is about 200 degrees.

TABLE 3

| Surface # | Radius of curvature (mm) | Thickness (mm) | Refractive index Nd | Abbe No. Vd | Note |
| --- | --- | --- | --- | --- | --- |
| S11 | 11.11 | 0.60 | 1.88 | 40.81 | First lens L21 |
| S12 | 4.03 | 1.44 | | | |
| S13 | 6.05 | 0.60 | 1.83 | 37.23 | Second lens L22 |
| S14 | 2.59 | 2.67 | | | |
| S15 | −4.06 | 0.84 | 1.50 | 81.61 | Third lens L23 |
| S16 | 4.06 | 0.35 | | | |
| S17 | 7.61 | 1.35 | 1.95 | 32.32 | Fourth lens L24 |
| S18 | −7.61 | 0.86 | | | |
| S19 | 7.48 | 1.83 | 1.50 | 81.61 | Fifth lens L25 |
| S110 | −4.78 | 0.11 | | | |
| S111 | ∞ | 0.32 | | | Aperture stop ST2 |
| S112 | 3.75 | 1.55 | 1.50 | 81.61 | Sixth lens L26 |
| S113 | −3.00 | 0.50 | 1.85 | 23.78 | Seventh lens L27 |
| S114 | 4.23 | 0.27 | | | |
| S115 | 16.70 | 1.24 | 1.55 | 75.50 | Eighth lens L28 |
| S116 | −4.53 | 0.15 | | | |
| S117 | 5.82 | 1.32 | 1.88 | 40.81 | Ninth lens L29 |
| S118 | −125.56 | 1.30 | | | |
| S119 | ∞ | 0.80 | 1.52 | 64.17 | Optical filter OF2 |
| S120 | ∞ | 0.10 | | | |

Table 4 illustrates the parameters for the conditions (7) to (12) and the calculation results of the conditions (7) to (12). From Table 4, the wide-angle lens assembly 2 in the second embodiment can satisfy the conditions (7) to (12).

TABLE 4

| TTL2 | 18.2 mm | $R2_{11}$ | 11.11 mm | f2 | 1.43 mm |
|---|---|---|---|---|---|
| $f2_3$ | −3.94 mm | $f2_{123}$ | −1.1 mm | $f2_{45}$ | 3.074 mm |
| $Vd2_2$ | 37.23 | $Nd2_2$ | 1.83 | | |
| $TTL2/R2_{11}$ | 1.638 | TTL2/f2 | 12.727 | $f2_{123}/f2_{45}$ | −0.358 |
| $Vd2_2/Nd2_2$ | 20.344 | $f2_3/f2$ | −2.755 | | |

Figure 4B:
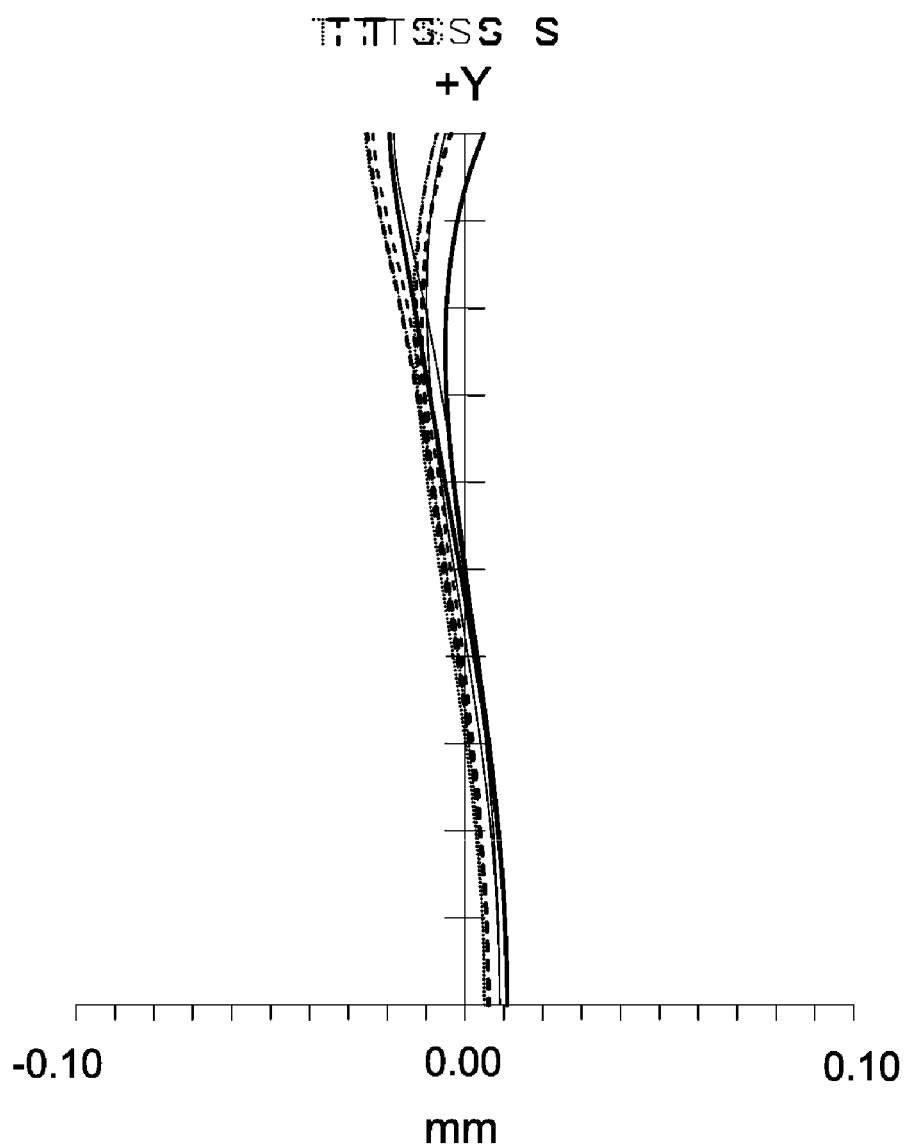
FIG. 4B is a schematic diagram illustrating the field curvature of the wide-angle lens assembly according to the second embodiment of the present disclosure.
Figure 4C:
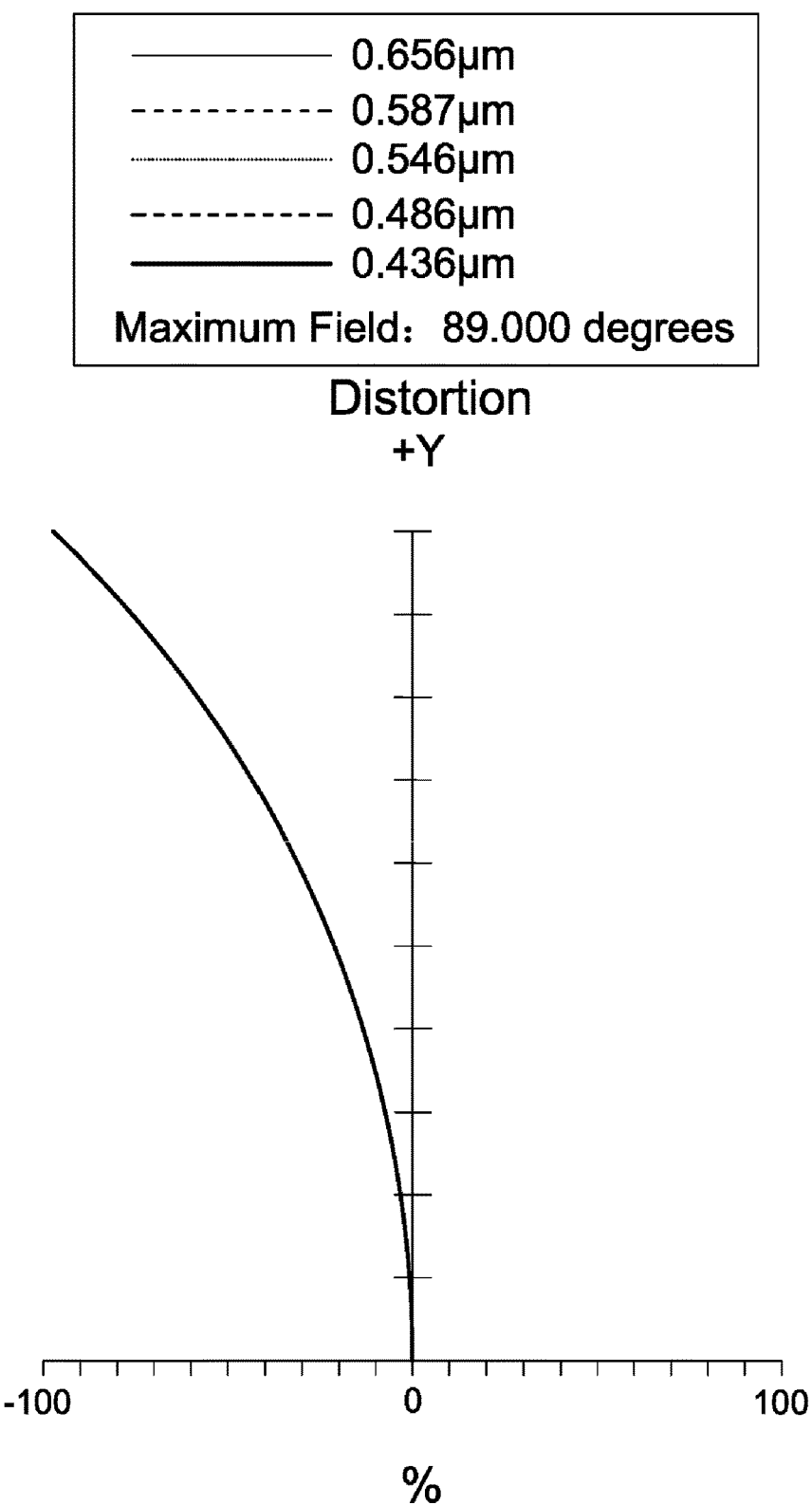
FIG. 4C is a schematic diagram illustrating the distortion of the wide-angle lens assembly according to the second embodiment of the present disclosure.
Figure 4E:
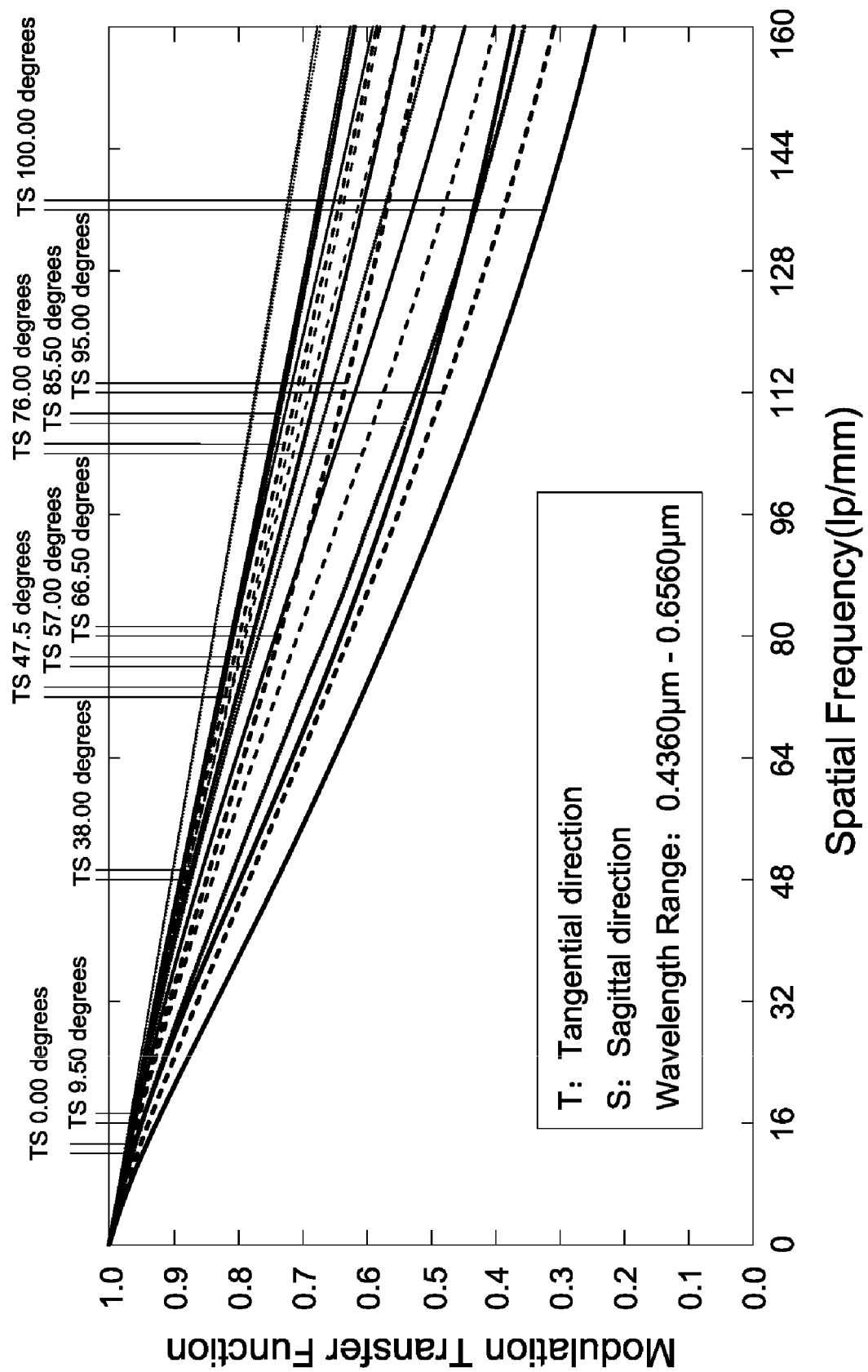
FIG. 4E is a schematic diagram illustrating the modulation transfer function of the wide-angle lens assembly according to the second embodiment of the present disclosure.

Moreover, it can be known from FIG. 4A to FIG. 4E that the wide-angle lens assembly 2 in the second embodiment can achieve the required optical performance. FIG. 4A is a schematic diagram illustrating the longitudinal aberration of the wide-angle lens assembly 2 according to the second embodiment of the present disclosure. FIG. 4B is a schematic diagram illustrating the field curvature of the wide-angle lens assembly 2 according to the second embodiment of the present disclosure. FIG. 4C is a schematic diagram illustrating the distortion of the wide-angle lens assembly 2 according to the second embodiment of the present disclosure. FIG. 4D is a schematic diagram illustrating the lateral color of the wide-angle lens assembly 2 according to the second embodiment of the present disclosure. FIG. 4E is a schematic diagram illustrating the modulation transfer function of the wide-angle lens assembly 2 according to the second embodiment of the present disclosure.

As shown in FIG. 4A, the longitudinal aberration amount in the wide-angle lens assembly 2 in the second embodiment ranges from −0.01 mm to 0.015 mm for the reference wavelengths of 0.436 μm, 0.486 μm, 0.546 μm, 0.587 μm and 0.656 μm.

As shown in FIG. 4B, the field curvature amount in the wide-angle lens assembly 2 in the second embodiment ranges from −0.03 mm to 0.015 mm in the tangential direction and the sagittal direction for the reference wavelengths of 0.436 μm, 0.486 μm, 0.546 μm, 0.587 μm and 0.656 μm.

As shown in FIG. 4C, the five lines almost overlap so that only one line is presented. The distortion amount in the wide-angle lens assembly 2 in the second embodiment ranges from −100% to 0% for the reference wavelengths of 0.436 μm, 0.486 μm, 0.546 μm, 0.587 μm and 0.656 μm.

As shown in FIG. 4D, the lateral color in the wide-angle lens assembly 2 of the second embodiment ranges from −1.0 μm to 3.5 μm, a maximum field angle is equal to 100.0000° for the wavelength of 0.436 μm, 0.486 μm, 0.546 μm, 0.587 μm, and 0.656 μm.

As shown in FIG. 4E, the modulation transfer function of angential direction and sagittal direction in the wide-angle lens assembly 2 of the second embodiment ranges from 0.25 to 1.0 wherein the wavelength ranges from 0.4360 μm to 0.6560 μm, the fields respectively are 0.00°, 9.50°, 38.00°, 47.50°, 57.00°, 66.50°, 76.00°, 85.50°, 95.00°, 100.00°, and the spatial frequency ranges from 0 lp/mm to 160 lp/mm.

Accordingly, it may be appreciated that the longitudinal aberration, the field curvature, the distortion and the lateral color of the wide-angle lens assembly 2 in the second embodiment can be efficiently corrected to achieve preferred optical performance.

Figure 5:
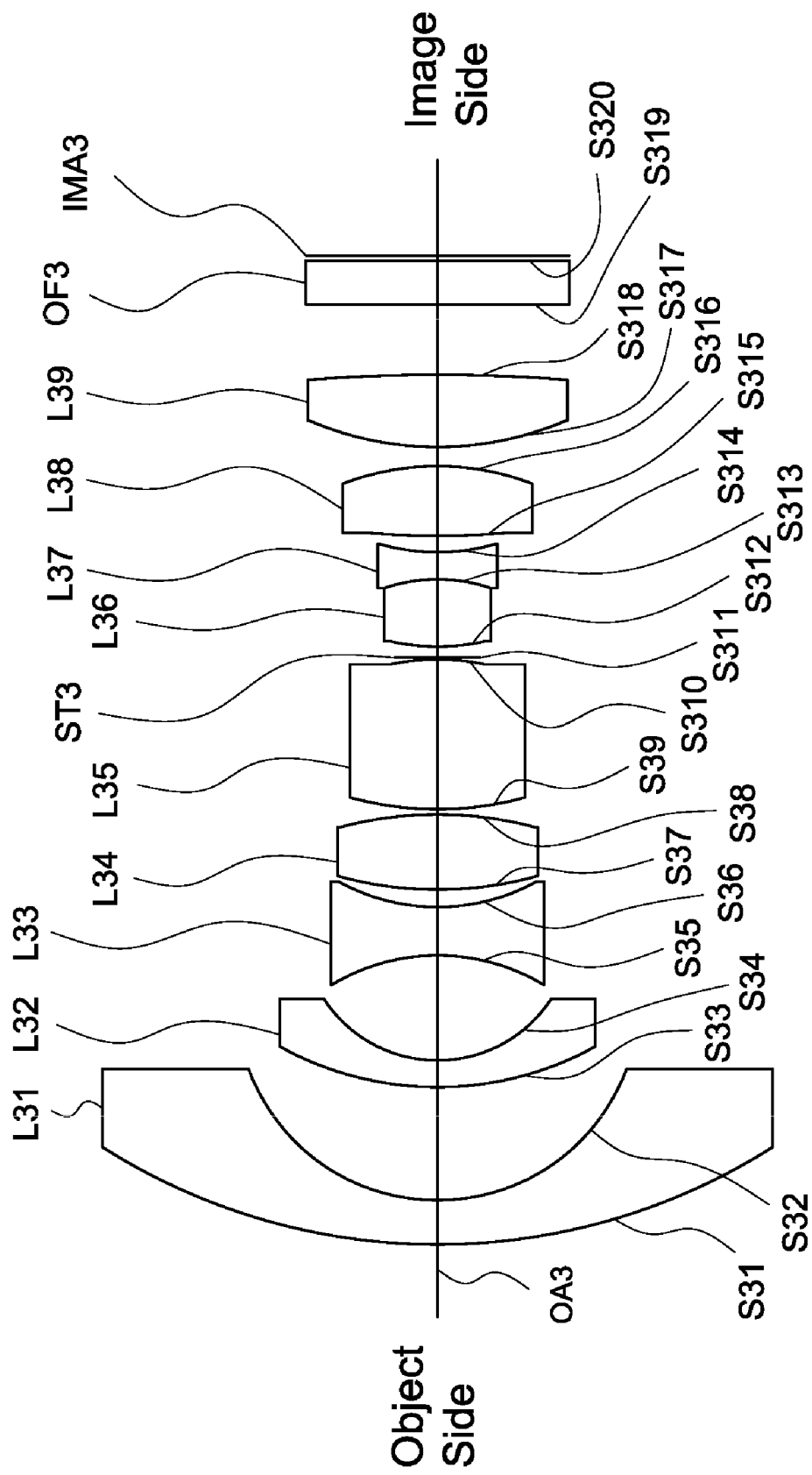
FIG. 5 is a schematic diagram illustrating the lens arrangement of a wide-angle lens assembly according to the third embodiment of the present disclosure.

Please refer to FIG. 5. FIG. 5 is a schematic diagram illustrating the lens arrangement of a wide-angle lens assembly according to the third embodiment of the present disclosure. The wide-angle lens assembly 3 includes a first lens L31, a second lens L32, a third lens L33, a fourth lens L34, a fifth lens L35, an aperture stop ST3, a sixth lens L36, a seventh lens L37, an eighth lens L38, a ninth lens L39 and an optical filter OF3, and these elements are arranged in order from an object side to an image side along an optical axis OA3. During imaging, the light from the object side is imaged on an imaging surface IMA2.

The first lens L31 is a meniscus lens having negative refractive power. The object-side surface S31 of the first lens L31 is a convex surface, and the image-side surface S32 of the first lens L31 is a concave surface. The object-side surface S31 and the image-side surface S32 are spherical surfaces.

The second lens L32 is a meniscus lens having negative refractive power. The object-side surface S33 of the second lens L32 is a convex surface, and the image-side surface S34 of the second lens L32 is a concave surface. The object-side surface S33 and the image-side surface S34 are spherical surfaces.

The third lens L33 is a biconcave lens having negative refractive power. The object-side surface S35 of the third lens L33 is a concave surface, and the image-side surface S36 of the third lens L33 is a concave surface. The object-side surface S35 and the image-side surface S36 are spherical surfaces.

The fourth lens L34 is a biconvex lens having positive refractive power. The object-side surface S37 of the fourth lens L34 is a convex surface, and the image-side surface S38 of the fourth lens L34 is a convex surface. The object-side surface S37 and the image-side surface S38 are spherical surfaces.

The fifth lens L35 is a biconvex lens having positive refractive power. The object-side surface S39 of the fifth lens L35 is a convex surface, and the image-side surface S310 of the fifth lens L35 is a convex surface. The object-side surface S39 and the image-side surface S310 are spherical surfaces.

The sixth lens L36 is a biconvex lens having positive refractive power. The object-side surface S312 of the sixth lens L36 is a convex surface, and the image-side surface S313 of the sixth lens L36 is a convex surface. The object-side surface S312 and the image-side surface S313 are spherical surfaces.

The seventh lens L37 is a biconcave lens having negative refractive power. The object-side surface S313 of the seventh lens L37 is a concave surface, and the image-side surface S314 of the seventh lens L37 is a concave surface. The object-side surface S313 and the image-side surface S314 are spherical surfaces.

The sixth lens L36 and the seventh lens L37 are doublet lenses.

The eighth lens L38 is a biconvex lens having positive refractive power. The object-side surface S315 of the eighth lens L38 is a convex surface, and the image-side surface S316 of the eighth lens L38 is a convex surface. The object-side surface S315 and the image-side surface S316 are spherical surfaces.

The ninth lens L39 is a biconvex lens having positive refractive power. The object-side surface S317 of the ninth lens L39 is a convex surface, and the image-side surface S318 of the ninth lens L39 is a convex surface. The object-side surface S317 and the image-side surface S318 are spherical surfaces.

The object-side surface S319 and the image-side surface S320 of the optical filter OF3 are flat surfaces.

Furthermore, the wide-angle lens assembly 3 in the third embodiment satisfies at least one of the following conditions:

$1.55 < TTL3/R3_{11} < 1.75$     (13)

$12.7 < TTL3/f3 < 12.9$     (14)

$$-0.4 < f3_{123}/f3_{45} < -0.3 \tag{15}$$

$$Vd3_2 > 30 \tag{16}$$

$$19.5 < Vd3_2/Nd3_2 < 22.5 \tag{17}$$

$$-2.8 < f3_3/f3 < -1.5 \tag{18}$$

The definitions of $f3_3$, $f3_{45}$, $f3_{123}$, $f3$, TTL3, $R3_{11}$, $Vd3_2$ and $Nd3_2$ are respectively the same as those of $f1_3$, $f1_{45}$, $f1_{123}$, $f1$, TTL1, $R1_{11}$, $Vd1_2$ and $Nd1_2$ in the first embodiment, and thus, the related descriptions will be omitted hereafter.

Because of the disposition of the above lenses and the aperture stop ST3 and satisfying one of the conditions (13) to (18), the wide-angle lens assembly 3 may have a wider view angle, an effective corrected aberration, an effective corrected chromatic aberration, and an effective increased resolution.

Further, since sufficiently-strong refractive power may hardly be achieved if the calculation result of $f3_3/f3$ in the condition (18) is larger than $-1.5$, it would be better that the calculation result of $f3_3/f3$ is smaller than $-1.5$. Therefore, $-2.8 < f3_3/f3 < -1.5$ is a condition range that is capable of providing sufficiently-strong refractive power when it is satisfied.

Table 5 illustrates the parameters of respective lenses in the wide-angle lens assembly 3 shown in FIG. 5. In Table 5, the effective focal length of the wide-angle lens assembly 3 is about 1.42 mm, the aperture value of the wide-angle lens assembly 3 is 2.80, the total length of the wide-angle lens assembly 3 is about 18.2 mm, and the view angle of the wide-angle lens assembly 3 is about 200 degrees.

TABLE 5

| Surface # | Radius of curvature (mm) | Thickness (mm) | Refractive index Nd | Abbe No. Vd | Note |
|---|---|---|---|---|---|
| S11 | 11.53 | 0.80 | 1.88 | 40.81 | First lens L31 |
| S12 | 3.70 | 2.09 | | | |
| S13 | 6.03 | 0.49 | 1.88 | 40.81 | Second lens L32 |
| S14 | 2.50 | 1.93 | | | |
| S15 | -3.76 | 0.89 | 1.50 | 81.61 | Third lens L33 |
| S16 | 3.76 | 0.32 | | | |
| S17 | 7.00 | 1.38 | 1.95 | 32.32 | Fourth lens L34 |
| S18 | -7.00 | 0.10 | | | |
| S19 | 6.10 | 2.76 | 1.50 | 81.61 | Fifth lens L35 |
| S110 | -4.17 | 0.03 | | | |
| S111 | ∞ | 0.21 | | | Aperture stop ST3 |
| S112 | 3.82 | 1.24 | 1.50 | 81.61 | Sixth lens L36 |
| S113 | -3.00 | 0.50 | 1.85 | 23.78 | Seventh lens L37 |
| S114 | 3.90 | 0.30 | | | |
| S115 | 15.91 | 1.28 | 1.59 | 68.62 | Eighth lens L38 |
| S116 | -4.83 | 0.35 | | | |
| S117 | 5.95 | 1.33 | 1.77 | 49.60 | Ninth lens L39 |
| S118 | -31.60 | 1.30 | | | |
| S119 | ∞ | 0.80 | 1.52 | 64.17 | Optical filter OF3 |
| S120 | ∞ | 0.10 | | | |

Table 6 illustrates the parameters for the conditions (13) to (18) and the calculation results of the conditions (13) to (18). From Table 6, the wide-angle lens assembly 3 in the third embodiment can satisfy the conditions (13) to (18).

TABLE 6

| TTL3 | 18.2 mm | $R3_{11}$ | 11.53 mm | f3 | 1.42 mm |
|---|---|---|---|---|---|
| $f3_3$ | -3.62 mm | $f3_{123}$ | -0.97 mm | $f3_{45}$ | 2.743 mm |
| $Vd3_2$ | 40.81 | $Nd3_2$ | 1.88 | | |
| TTL3/$R3_{11}$ | 1.578 | TTL3/f3 | 12.817 | $f3_{123}/f3_{45}$ | -0.354 |
| $Vd3_2/Nd3_2$ | 21.707 | $f3_3/f3$ | -2.549 | | |

Figure 6B:
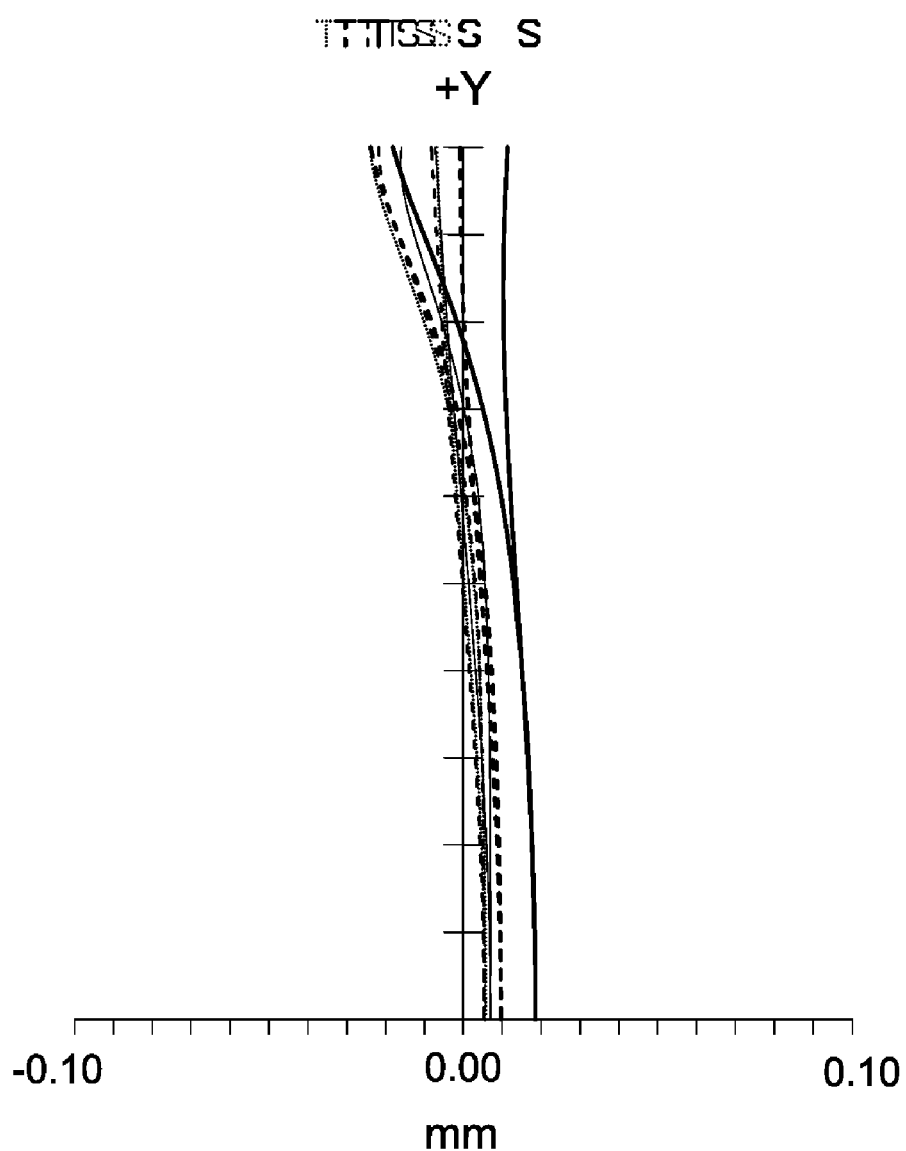
FIG. 6B is a schematic diagram illustrating the field curvature of the wide-angle lens assembly according to the third embodiment of the present disclosure.
Figure 6C:
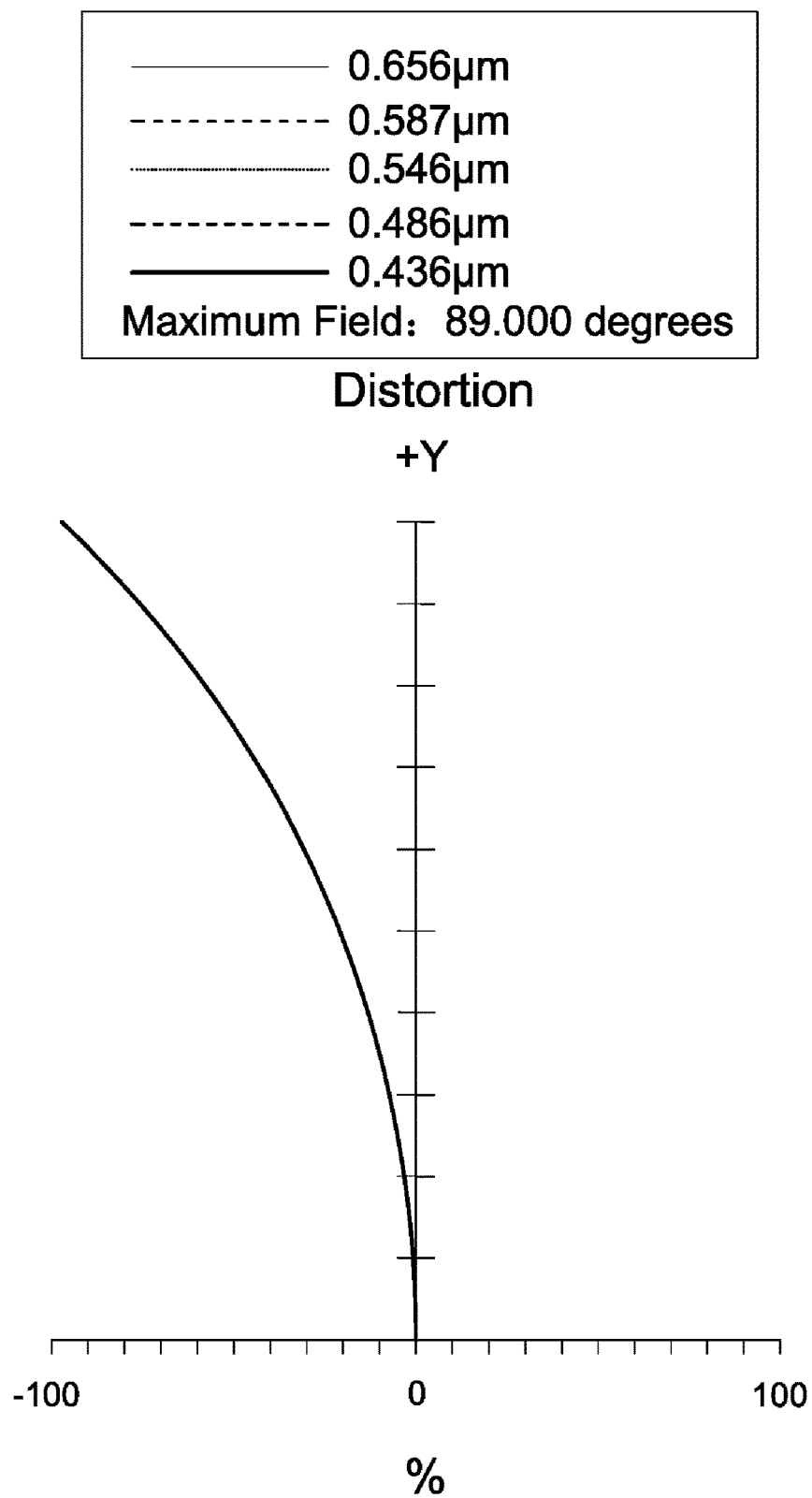
FIG. 6C is a schematic diagram illustrating the distortion of the wide-angle lens assembly according to the third embodiment of the present disclosure.
Figure 6E:
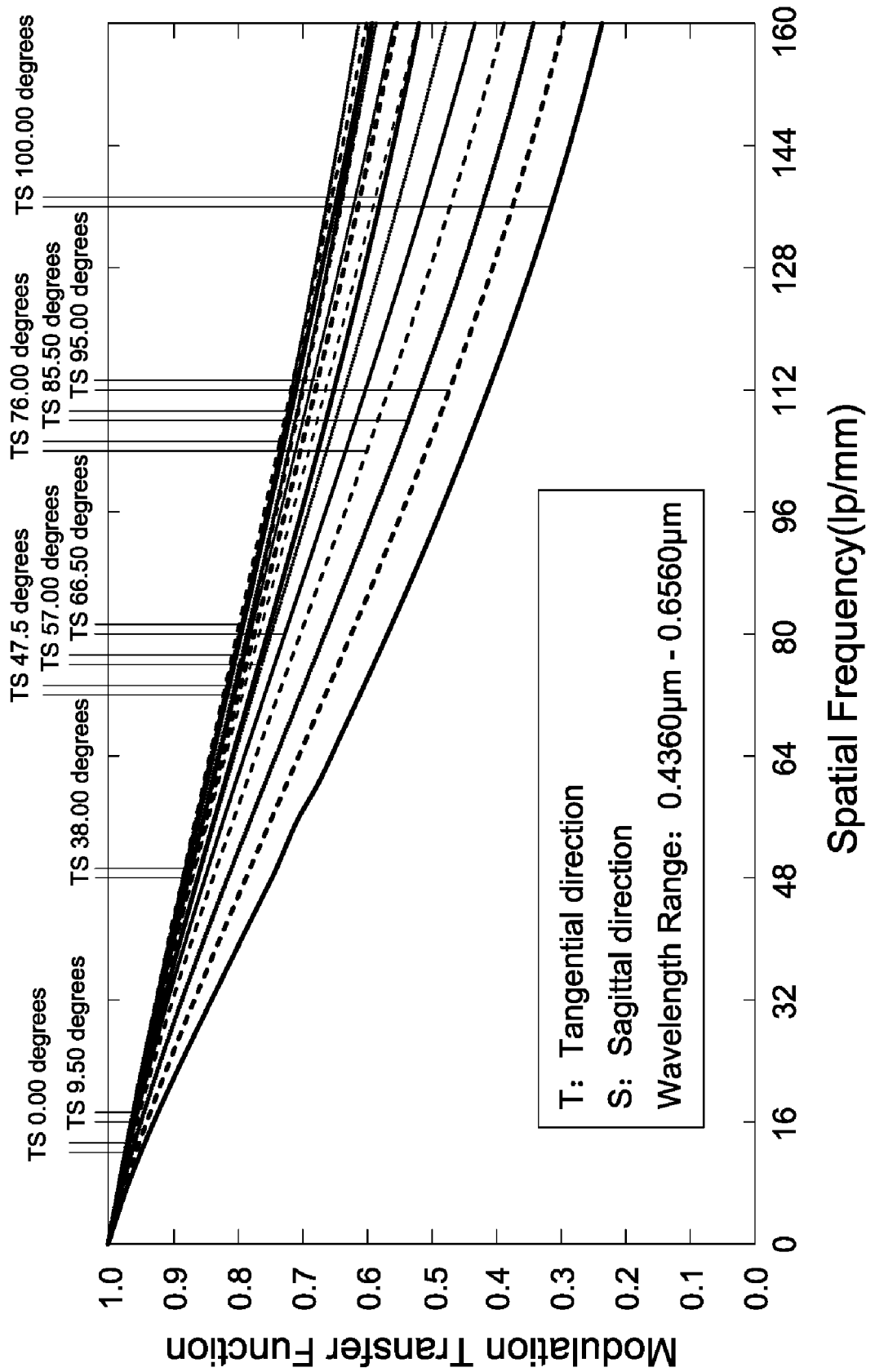
FIG. 6E is a schematic diagram illustrating the modulation transfer function of the wide-angle lens assembly according to the third embodiment of the present disclosure.

Moreover, it can be known from FIG. 6A to FIG. 6E that the wide-angle lens assembly 3 in the third embodiment can achieve the required optical performance. FIG. 6A is a schematic diagram illustrating the longitudinal aberration of the wide-angle lens assembly 3 according to the third embodiment of the present disclosure. FIG. 6B is a schematic diagram illustrating the field curvature of the wide-angle lens assembly 3 according to the third embodiment of the present disclosure. FIG. 6C is a schematic diagram illustrating the distortion of the wide-angle lens assembly 3 according to the third embodiment of the present disclosure. FIG. 6D is a schematic diagram illustrating the lateral color of the wide-angle lens assembly 3 according to the third embodiment of the present disclosure. FIG. 6E is a schematic diagram illustrating the modulation transfer function of the wide-angle lens assembly 3 according to the third embodiment of the present disclosure.

As shown in FIG. 6A, the longitudinal aberration amount in the wide-angle lens assembly 3 in the third embodiment ranges from $-0.025$ mm to $0.02$ mm for the reference wavelengths of 0.436 μm, 0.486 μm, 0.546 μm, 0.587 μm and 0.656 μm.

As shown in FIG. 6B, the field curvature amount in the wide-angle lens assembly 3 in the third embodiment ranges from $-0.03$ mm to $0.02$ mm in the tangential direction and the sagittal direction for the reference wavelengths of 0.436 μm, 0.486 μm, 0.546 μm, 0.587 μm and 0.656 μm.

As shown in FIG. 6C, the five lines almost overlap so that only one line is presented. The distortion amount in the wide-angle lens assembly 3 in the third embodiment ranges from $-100\%$ to $0\%$ for the reference wavelengths of 0.436 μm, 0.486 μm, 0.546 μm, 0.587 μm and 0.656 μm.

As shown in FIG. 6D, the lateral color in the wide-angle lens assembly 3 of the third embodiment ranges from $-0.6$ μm to $3.5$ μm, a maximum field angle is equal to 100.0000° for the wavelength of 0.436 μm, 0.486 μm, 0.546 μm, 0.587 μm, and 0.656 μm.

As shown in FIG. 6E, the modulation transfer function of angential direction and sagittal direction in the wide-angle lens assembly 3 of the third embodiment ranges from 0.24 to 1.0 wherein the wavelength ranges from 0.4360 μm to 0.6560 μm, the fields respectively are 0.00°, 9.50°, 38.00°, 47.50°, 57.00°, 66.50°, 76.00°, 85.50°, 95.00°, 100.00°, and the spatial frequency ranges from 0 lp/mm to 160 lp/mm.

Accordingly, it may be appreciated that the longitudinal aberration, the field curvature, the distortion and the lateral color of the wide-angle lens assembly 3 in the third embodiment can be efficiently corrected to achieve preferred optical performance. Even though the primary conditions to be satisfied in the present disclosure are $12.7 < TTL/f < 12.9$, $19.5 < Vd_2/Nd_2 < 22.5$ and $-2.8 < f_3/f < -1.5$, this embodiment also satisfies the other conditions. Satisfying the condition $12.7 < TTL/f < 12.9$ enables the wide-angle lens assembly to achieve miniaturization. Satisfying the condition $19.5 < Vd_2/Nd_2 < 22.5$ enables the wide-angle lens assembly to have the better achromatic ability. Satisfying $-2.8 < f_3/f < -1.5$ enables the wide-angle lens assembly to have sufficiently-strong refractive power.

It should be understood that although the present disclosure has been described with reference to the above preferred embodiments, these embodiments are not intended to retrain the present disclosure. It will be apparent to one of ordinary skill in the art that various changes or modifications to the described embodiments can be made without departing from the spirit of the present disclosure. Accordingly, the scope of the present disclosure is defined by the attached claims.

What is claimed is:

1. A wide-angle lens assembly, in sequence from an object side to an image side along an optical axis, comprising:
    a first lens which is a meniscus lens with refractive power;
    a second lens which is a meniscus lens with refractive power;
    a third lens with refractive power, which includes a concave surface facing the object side;
    a fourth lens with positive refractive power, which includes a convex surface facing the image side;
    a fifth lens with refractive power;
    a sixth lens which is a biconvex lens with positive refractive power;
    a seventh lens with refractive power;
    an eighth lens with positive refractive power; and
    a ninth lens with positive refractive power;
    wherein the lens assembly satisfies the following condition:

$-0.4 < f_{123}/f_{45} < -0.3$;

wherein $f_{123}$ is an effective focal length of a combination of the first lens, the second lens, and the third lens, and $f_{45}$ is an effective focal length of a combination of the fourth lens and the fifth lens.

2. A wide-angle lens assembly, in sequence from an object side to an image side along an optical axis, comprising:
    a first lens which is a meniscus lens with refractive power;
    a second lens which is a meniscus lens with refractive power;
    a third lens with refractive power, which includes a concave surface facing the object side;
    a fourth lens with positive refractive power, which includes a convex surface facing the image side;
    a fifth lens with refractive power;
    a sixth lens which is a biconvex lens with positive refractive power;
    a seventh lens with refractive power;
    an eighth lens with positive refractive power; and
    a ninth lens with positive refractive power;
    wherein the lens assembly satisfies the following condition:

$12.7 < TTL/f < 12.9$ wherein TTL is an interval from an object side surface of the first lens to the image plane along the optical axis and f is an effective focal length of the wide-angle lens assembly.

3. The wide-angle lens assembly as claimed in claim 2, wherein the wide-angle lens assembly satisfies:

$Vd_2 > 30$;

wherein $Vd_2$ is an Abbe number of the second lens.

4. The wide-angle lens assembly as claimed in claim 1, wherein the wide-angle lens assembly satisfies:

$19.5 < Vd_2/Nd_2 < 22.5$ wherein $Vd_2$ is an Abbe number of the second lens and $Nd_2$ is a refractive index of the second lens.

5. The wide-angle lens assembly as claimed in claim 2, wherein the sixth lens and the seventh lens are cemented together.

6. The wide-angle lens assembly as claimed in claim 5, further comprising a stop disposed between the fifth lens and the seventh lens.

7. The wide-angle lens assembly as claimed in claim 2, wherein the wide-angle lens assembly satisfies:

$1.55 < TTL/R_{11} < 1.75$ wherein TTL is the interval from the object side surface of the first lens to the image plane along the optical axis and Ru is a radius of curvature of an object side surface of the first lens.

8. The wide-angle lens assembly as claimed in claim 2, wherein the wide-angle lens assembly satisfies:

$-0.4 < f_{123}/f_{45} < -0.3$ wherein $f_{123}$ is an effective focal length of a combination of the first lens, the second lens and the third lens, and $f_{45}$ is an effective focal length of a combination of the fourth lens and the fifth lens.

9. The wide-angle lens assembly as claimed in claim 2, wherein the wide-angle lens assembly satisfies:

$-2.8 < f_3/f < -1.5$ wherein $f_3$ is a focal length of the third lens and f is an effective focal length of the wide-angle lens assembly.

10. The wide-angle lens assembly as claimed in claim 2, further comprising a stop disposed between the fifth lens and the seventh lens.

11. The wide-angle lens assembly as claimed in claim 2, wherein the first lens is with negative refractive power, and further comprises a convex surface facing the object side and a concave surface facing the image side.

12. The wide-angle lens assembly as claimed in claim 2, wherein the second lens is with negative refractive power, and further comprises a convex surface facing the object side and a concave surface facing the image side.

13. The wide-angle lens assembly as claimed in claim 2, wherein the third lens is with negative refractive power, and further comprises a concave surface facing the image side.

14. The wide-angle lens assembly as claimed in claim 2, wherein the fourth lens further comprises a convex surface facing the object side.

15. The wide-angle lens assembly as claimed in claim 2, wherein the fifth lens is a biconvex lens with positive refractive power.

16. The wide-angle lens assembly as claimed in claim 2, wherein the seventh lens is a biconcave lens with negative refractive power.

17. The wide-angle lens assembly as claimed in claim 2, wherein the eighth lens is a biconvex lens.

18. The wide-angle lens assembly as claimed in claim 2, wherein the ninth lens is a biconvex lens.

* * * * *